RECORDING APPARATUS

Filed May 31, 1960 10 Sheets-Sheet 1

INVENTORS
WILLIAM A. MONTICELLO
THOMAS N. YESOWICH
BY Benjamin J. Barish
ATTORNEY Jan. 30, 1962 W. A. MONTICELLO ETAL 3,018,721

RECORDING APPARATUS

Filed May 31, 1960 10 Sheets-Sheet 2

INVENTORS
WILLIAM A. MONTICELLO
THOMAS N. YESOWICH
BY [signature]
ATTORNEY

INVENTORS
WILLIAM A. MONTICELLO
THOMAS N. YESOWICH
BY Benjamin J. Barish
ATTORNEY

RECORDING APPARATUS

Filed May 31, 1960 10 Sheets-Sheet 4

INVENTORS
WILLIAM A. MONTICELLO
THOMAS N. YESOWICH
BY
ATTORNEY

RECORDING APPARATUS

Filed May 31, 1960

INVENTORS
WILLIAM A. MONTICELLO
THOMAS N. YESOWICH
BY Benjamin J. Barish
ATTORNEY INVENTORS
WILLIAM A. MONTICELLO
THOMAS N. YESOWICH
BY Benjamin C. Baird
ATTORNEY

RECORDING APPARATUS

INVENTORS
WILLIAM A. MONTICELLO
THOMAS N. YESOWICH
BY
ATTORNEY

INVENTORS
WILLIAM A. MONTICELLO
THOMAS N. YESOWICH
BY Benjamin J. Bausch
ATTORNEY

RECORDING APPARATUS

Filed May 31, 1960 10 Sheets-Sheet 9

INVENTORS
WILLIAM A. MONTICELLO
THOMAS N. YESOWICH
BY Benjamin J. Barish
ATTORNEY 3,018,721
RECORDING APPARATUS William A. Monticello, Detroit, and Thomas N. Yesowich, Roseville, Mich., assignors to Burroughs Corporation, Detroit, Mich., a corporation of Michigan Filed May 31, 1960, Ser. No. 33,017
19 Claims. (Cl. 101—93)

This invention relates to apparatus for recording information on a record sheet, and particularly to a machine for recording information, e.g. amounts, account numbers, etc. on a check or other document.

The invention is especially suitable for use in mechanized check handling systems wherein information is printed on the source document itself, such as a check, and thenceforth is read, sorted, and processed by automatic equipment. In the United States, the banking industry has adopted magnetic ink character recognition as the common machine language most suitable for mechanized check handling. This approach requires the information to be printed on the check or other document in magnetic ink using a type font that can be optically read by person as well as magnetically read by machine. The bottom edge of the check has been designated as the printing location. Mechanized check handling systems, and particularly those utilizing magnetic ink character recognition, require much higher standards of printing, not only in the type font but also in the registration, intensity and uniformity of the printed characters.

The present invention is described below as embodied in a machine for printing information in magnetic ink characters for use in the foregoing system. It will be understood, however, that many features of the invention are capable of use in other recording systems, and therefore the described embodiment is to be considered merely illustrative and not limiting.

A broad object of the invention is to provide improved apparatus for recording information on a record sheet.

A particular object of the invention is to provide apparatus for printing information on a check or other document consistent with the high degree of printing standards required to enable the document to be read and processed in mechanized systems.

A further object of the invention is to provide recording apparatus, particularly for printing characters representing amount information, with improved means for selectively controlling the recording elements so as to effect recording in certain orders and suppression thereof in others.

A still further object of the invention is to provide an improved printing arrangement for more evenly distributing the load on the printing elements drive.

According to one aspect of the invention, printing with improved registration, intensity and uniformity in the printed characters is achieved by the use of interposers which are moved during an early part of the machine cycle to engage the check or other document and to press same against the inking ribbon and the printing wheels. The interposers are then sharply struck by their respective printing hammers to effect printing on the check. The record sheet is thus positively immobilized by the printing wheels and interposers before the printing impact, and also, the interposers are more positively registered during the printing action.

According to another aspect of the invention, means are provided for selectively controlling the printing so as to effect printing in certain orders and to suppress printing in others. The orders to print or to be suppressed are dependent upon the particular operation of the machine as determined by the keyboard keys depressed. The control for any particular operation is effected by a programming device which responds to the keys depressed to control both the interposers which engage the check before they are struck by the hammers, and also the hammers, the arrangement being such that only the interposers in those orders which are to print are permitted to engage the check before impact, and only the hammers in those orders which are to print are permitted to strike their respective interposers. The programming means disclosed for effecting this control includes a rotatable coding device for selectively controlling the interposers and hammers, depending upon its position. Its position is determined by the keys on the keyboard which are depressed for that operation and thereby control electrical circuits to a rotatable switch fastened to the rotatable coding device.

According to another aspect of the invention, after the printing wheels are differentially positioned, the hammers are released in a preselected sequence to effect printing. This arrangement of separating the times in which the hammers are fired more evenly distributes the load on the hammer drive. In the arrangement disclosed, half of the hammers are fired at one time and the other half are fired at a time shortly thereafter.

These and other objects and advantages which will become apparent as the description proceeds are attainable by the present invention which is described below, for illustrative purposes only, as embodied in a machine for printing principally amount information on a check or other document.

Figure 3:
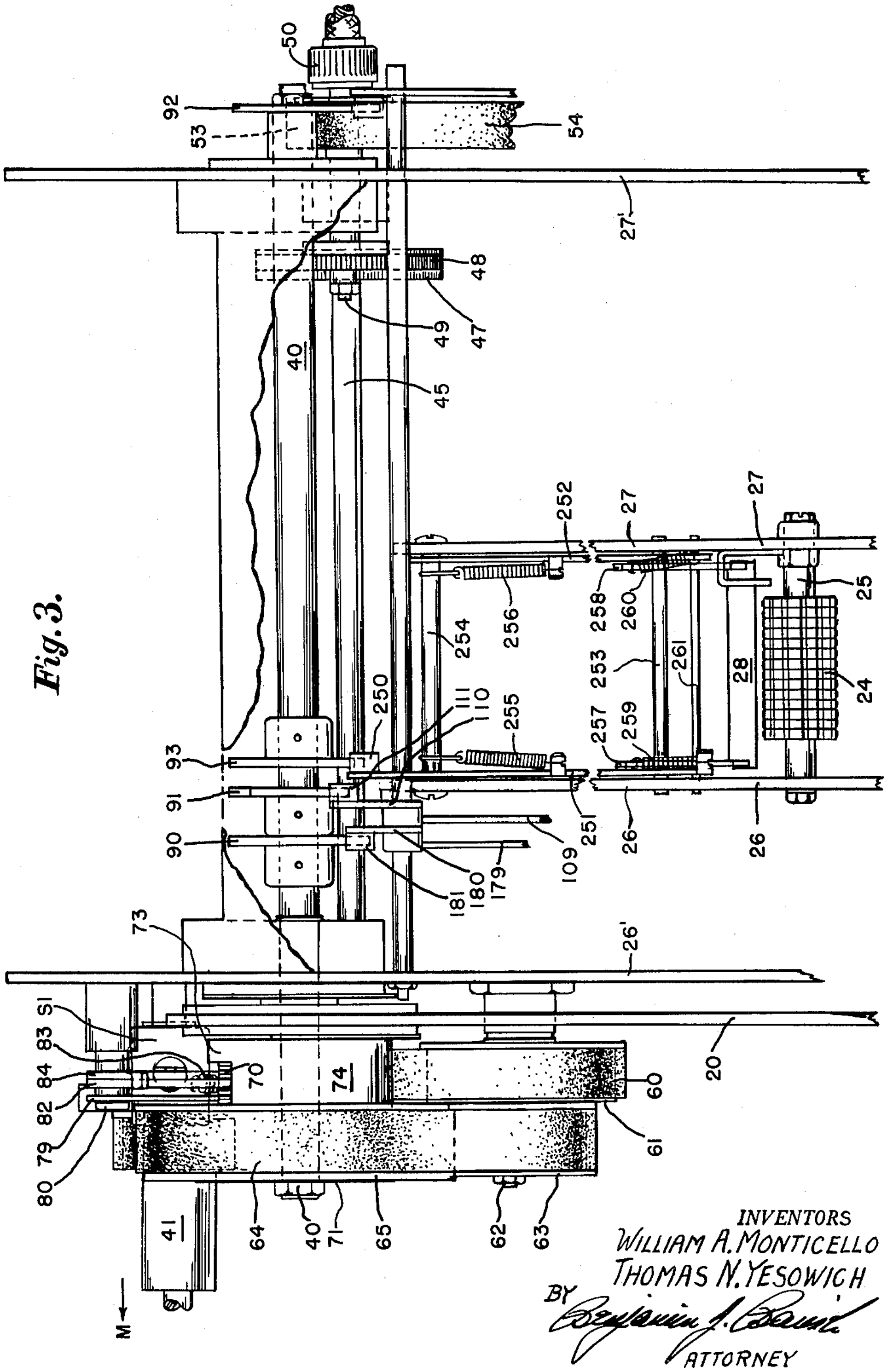
FIG. 3 is a top plan view of certain parts of the apparatus particularly showing parts of the drive mechanism, the main camshaft, and the aligning mechanism.
Figure 8:
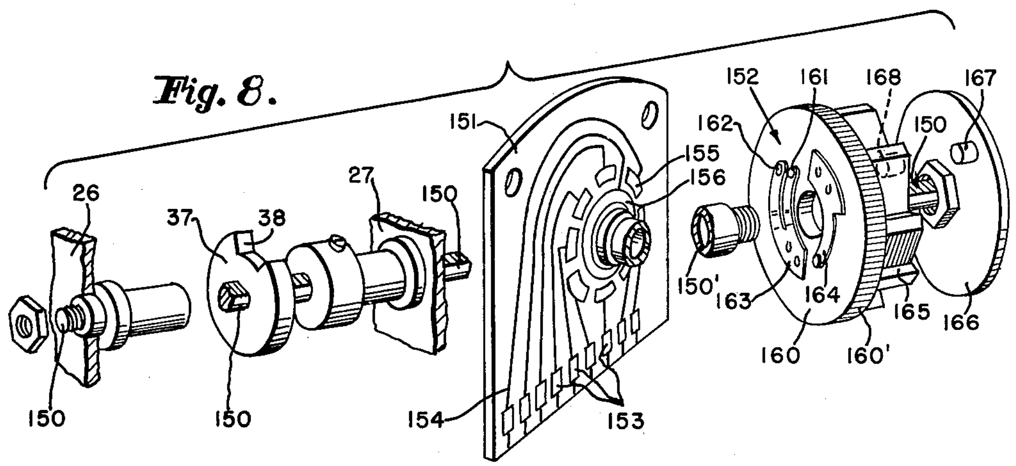
Figures 4A, 9:
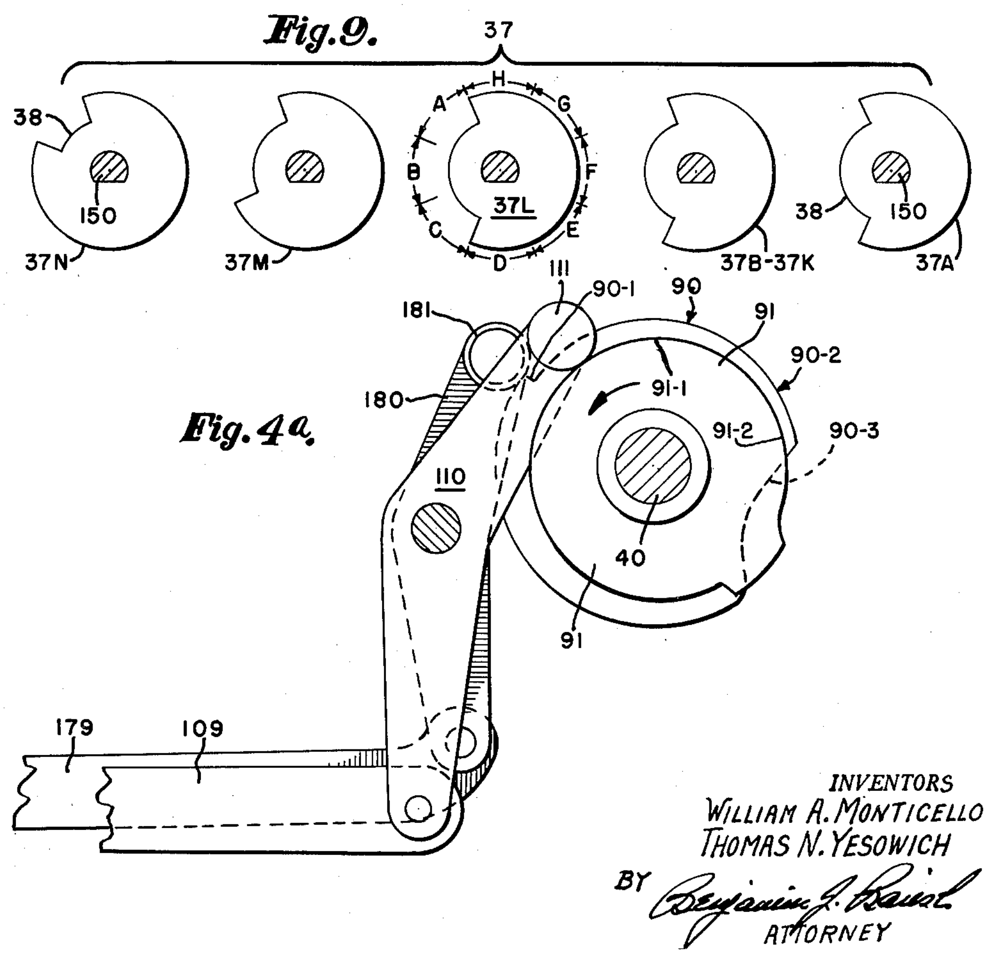
Figure 5:
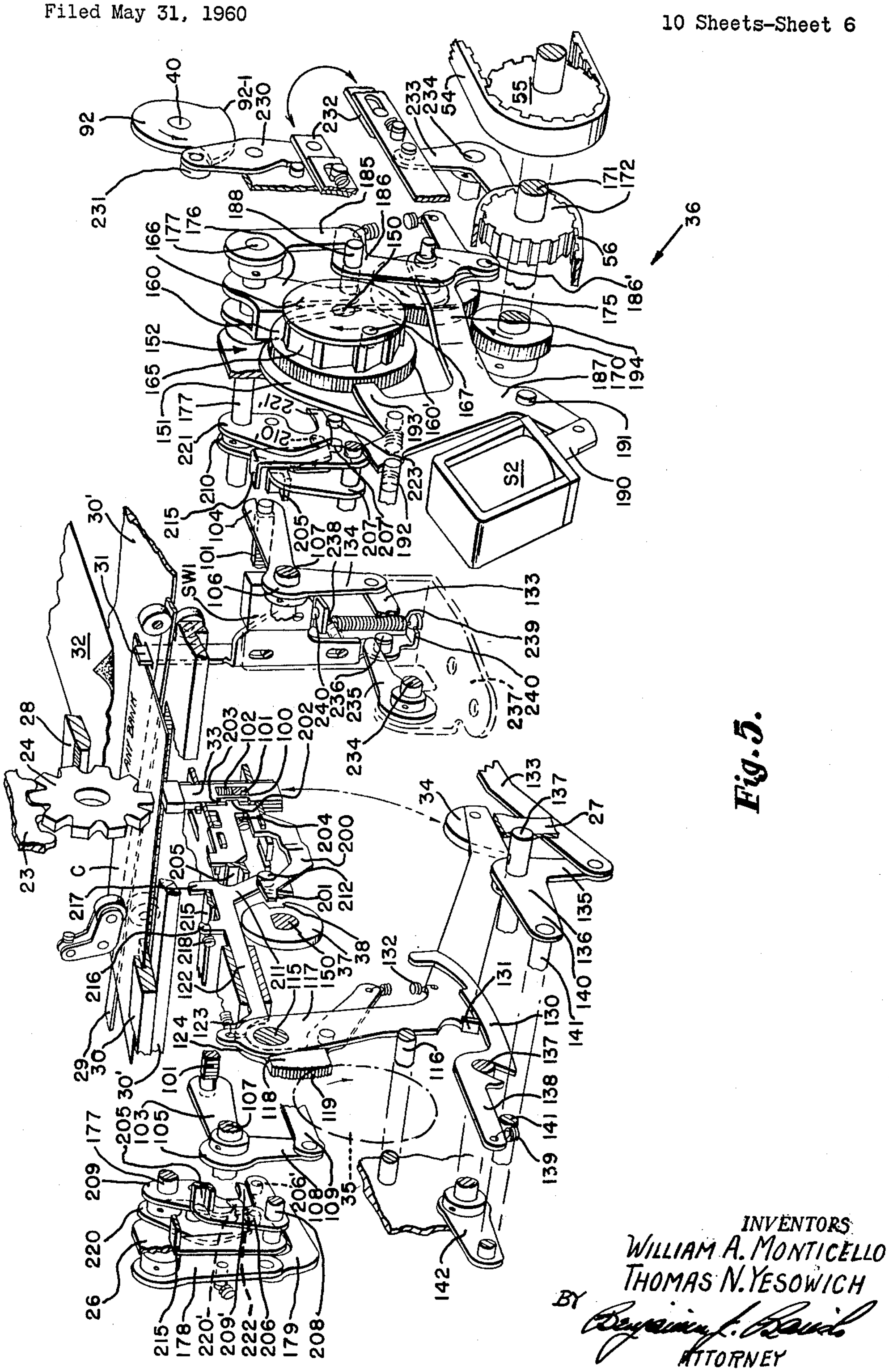
Figure 6:
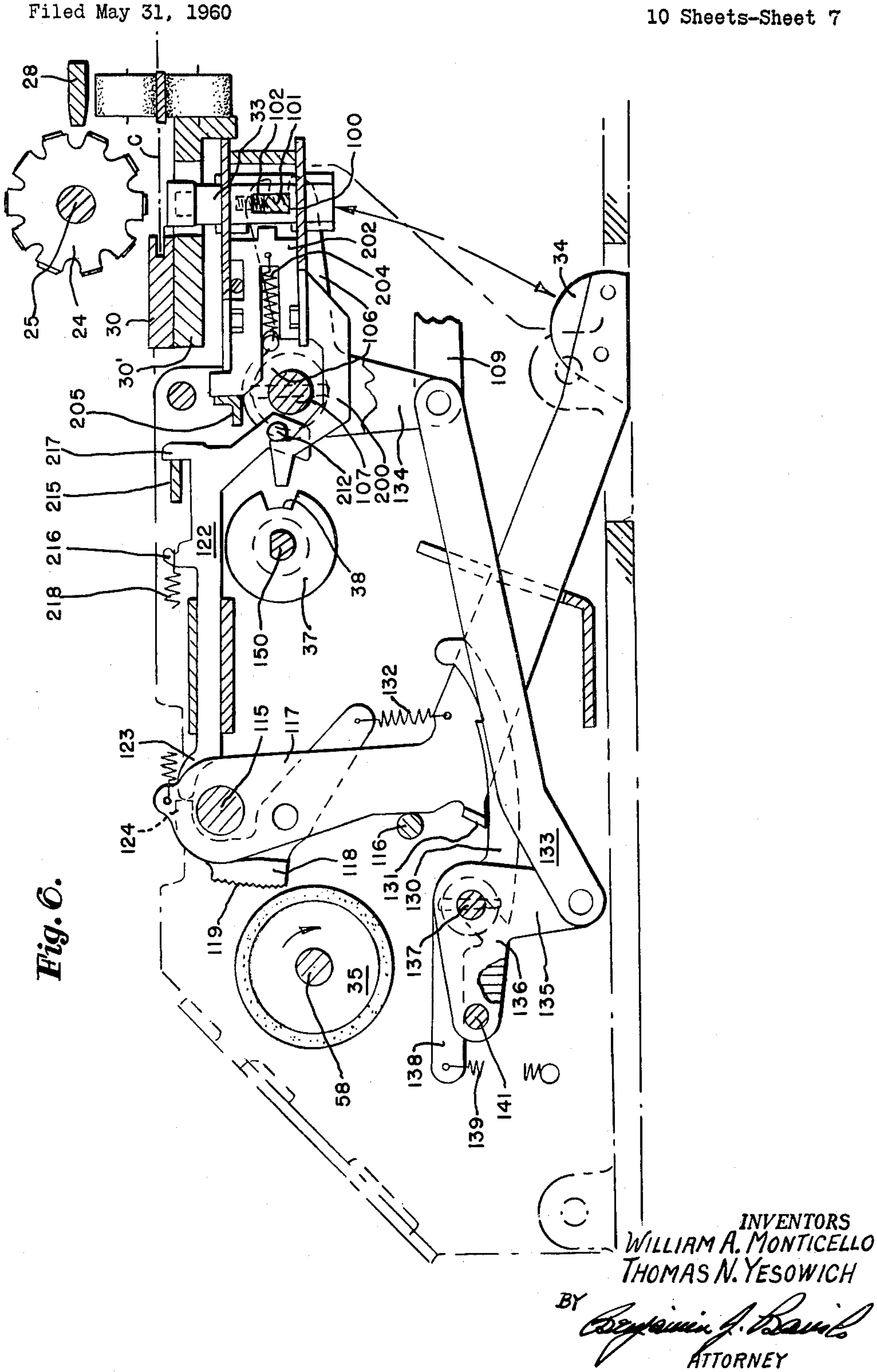
Figure 7:
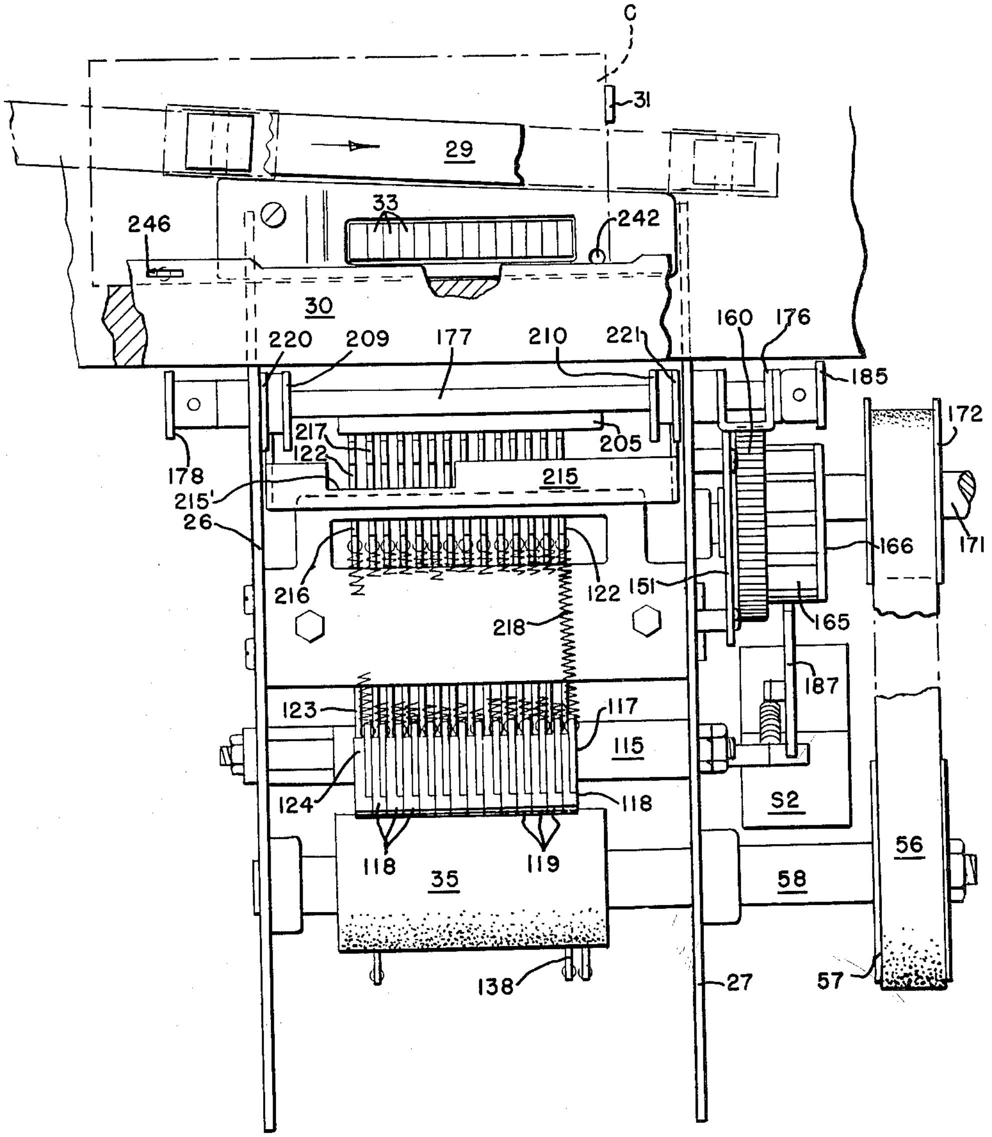
Figure 10:
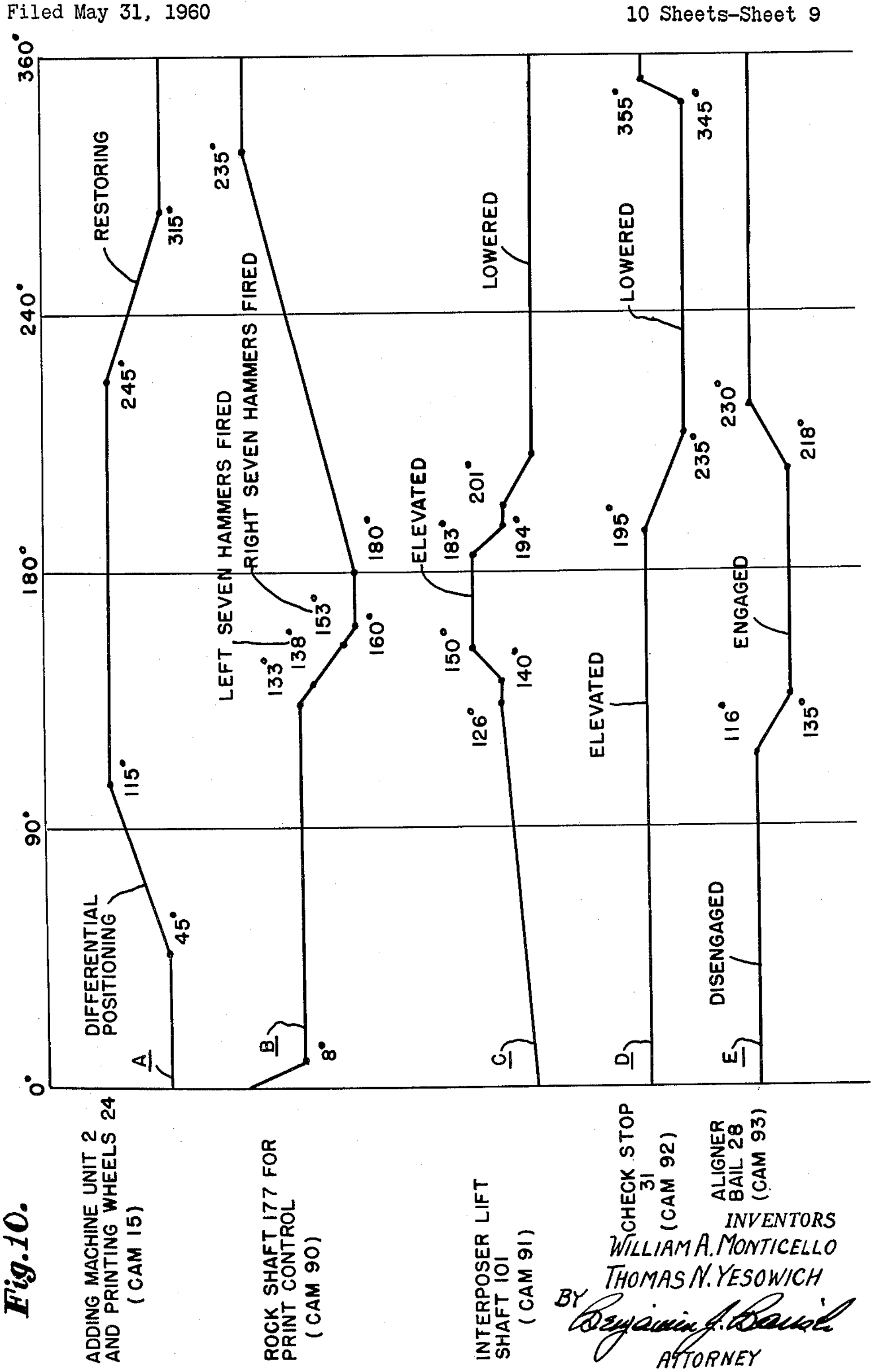
Figure 11:
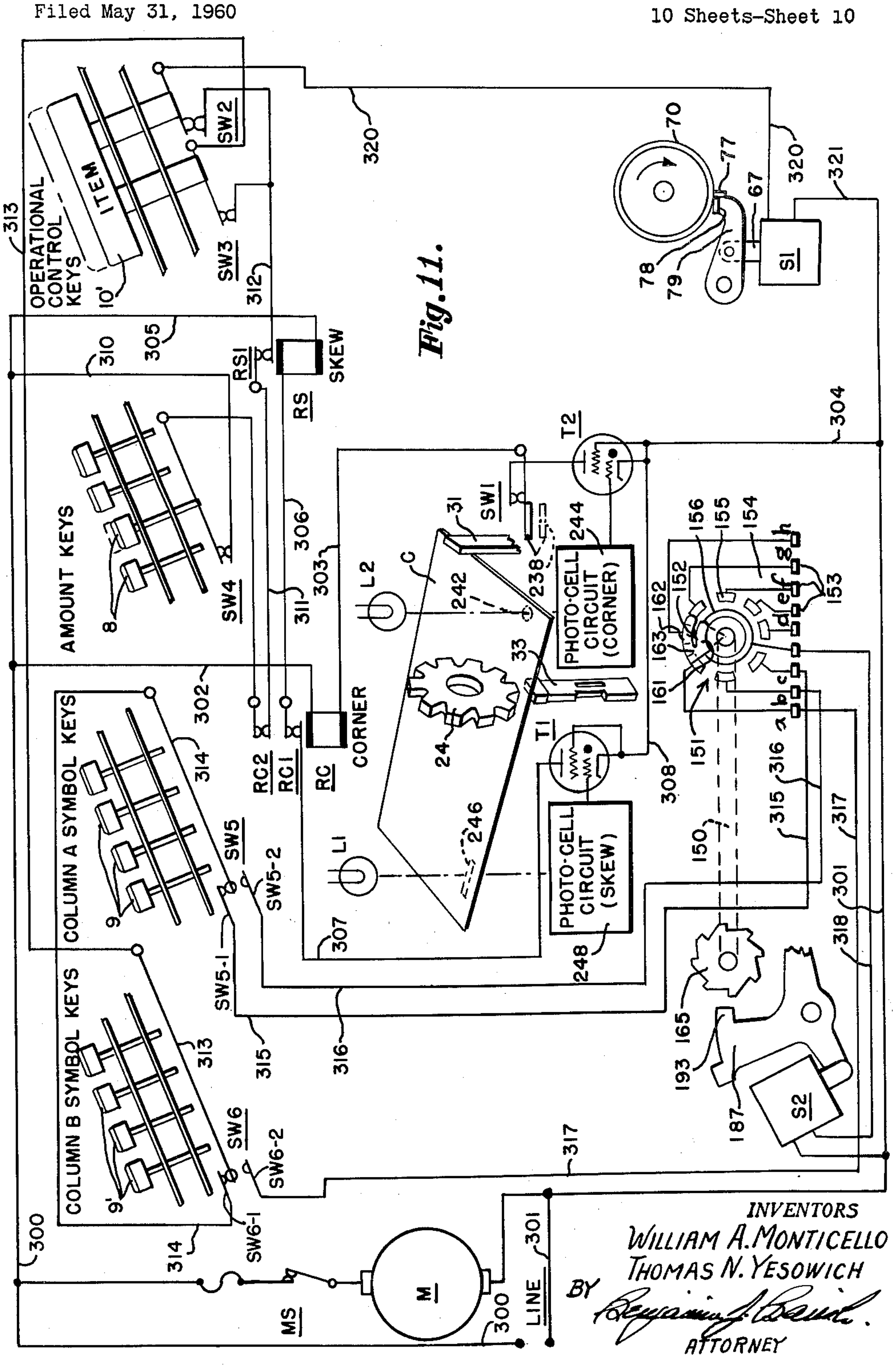

FIG. 4*a* illustrates a pair of cams driven by the drive mechanism which control various operations in the apparatus;

FIG. 5 is a perspective view, with parts broken away and other parts in section, of the salient elements of the printing mechanism and means for selectively controlling or suppressing the printing;

FIG. 6 is a side elevational view, partly in section, illustrating the mechanism of FIG. 5 when its parts are in their normal positions before cycling of the machine;

FIG. 7 is a top plan view similar to FIG. 3 but illustrating the front portion of the machine to show the printing mechanism and control;

FIG. 8 is an exploded perspective view of a rotatable switch and parts of a coding disk assembly included in the programming device for controlling the orders which will print and those which will be suppressed;

FIG. 9 is a view of five coding disks which explains and illustrates the configurations of all fourteen coding disks included in the assembly of FIG. 8;

FIG. 10 is a timing diagram illustrating the functions of various mechanisms; and FIG. 11 is a circuit diagram illustrating in simplified form a circuit that may be used for controlling the operations of the apparatus disclosed.

*General construction*

Figure 1:
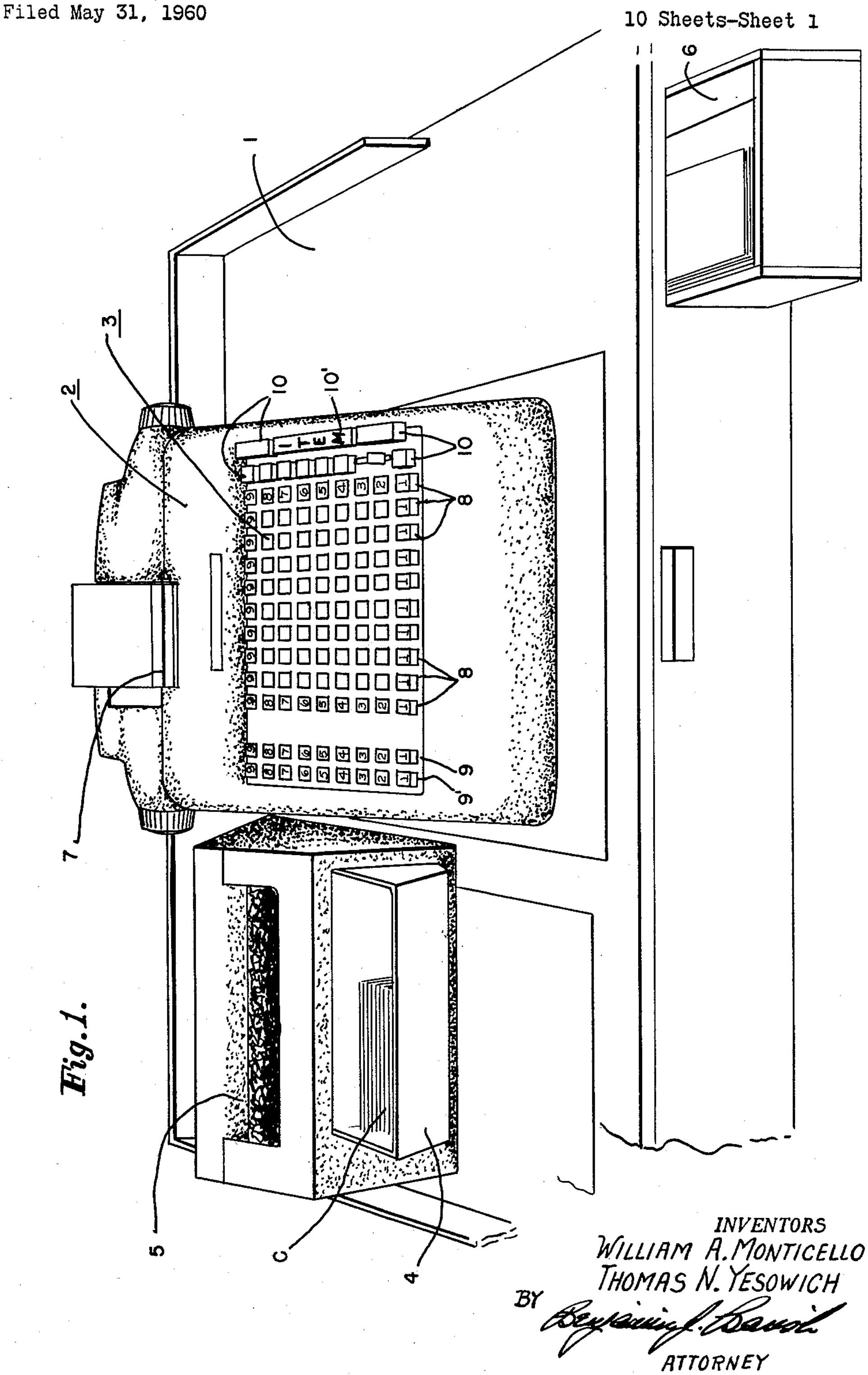
FIG. 1 is a perspective view of the apparatus embodying the present invention.

The general construction of the apparatus is illustrated in FIG. 1 and includes a stand 1 carrying a printing control unit 2 having a keyboard 3 in which amount information is entered and machine operations are controlled by depression of the appropriate keys. A plurality of checks C are retained in a storage hopper 4 and are manually fed into a feeding chute 5. From there they are transported by means housed within stand 1 until they are positioned in their proper locations under unit 2 at which time the amounts entered on keyboard 3 are printed thereon. After printing, the checks are fed to a receiving hopper 6 where they accumulate in stacked formation until the hopper is emptied.

Unit 2 is used in the present invention for introducing the amounts and controlling the printing thereof on the checks, but is actually a complete adding machine including not only the keyboard 3 but also its own accumulation mechanism (accumulator pinion 13, FIG. 2), its own tape printing mechanism 7, etc. Hence, it is frequently referred to in the present description as the adding machine unit. The machine illustrated is basically a Burroughs "Series P" full keyboard adding machine that has been modified to incorporate the present invention as will be described more fully below. It includes ten columns of amount keys 8, two columns of code identification keys 9 and 9′ (hereinafter referred to as Columns A and B Symbol Keys), and a number of operation control keys 10 which occupy about the equivalent of two columns on the keyboard. Amount keys 8 are used to enter amounts into the machine; Columns A and B Symbol Keys 9 and 9′ are used to print various predetermined code symbols and to also control the printing as will be described below; and the operation control keys 10 are used to initiate a cycle of operation of the machine and to exercise various other operational controls which are not involved in the present invention to any great extent. The present invention is primarily concerned with Item Key 10′ of the operation control keys, as will be described more fully below, and therefore the other operation control keys are not labeled or described herein in the interests of simplifying the present description.

Figure 2:
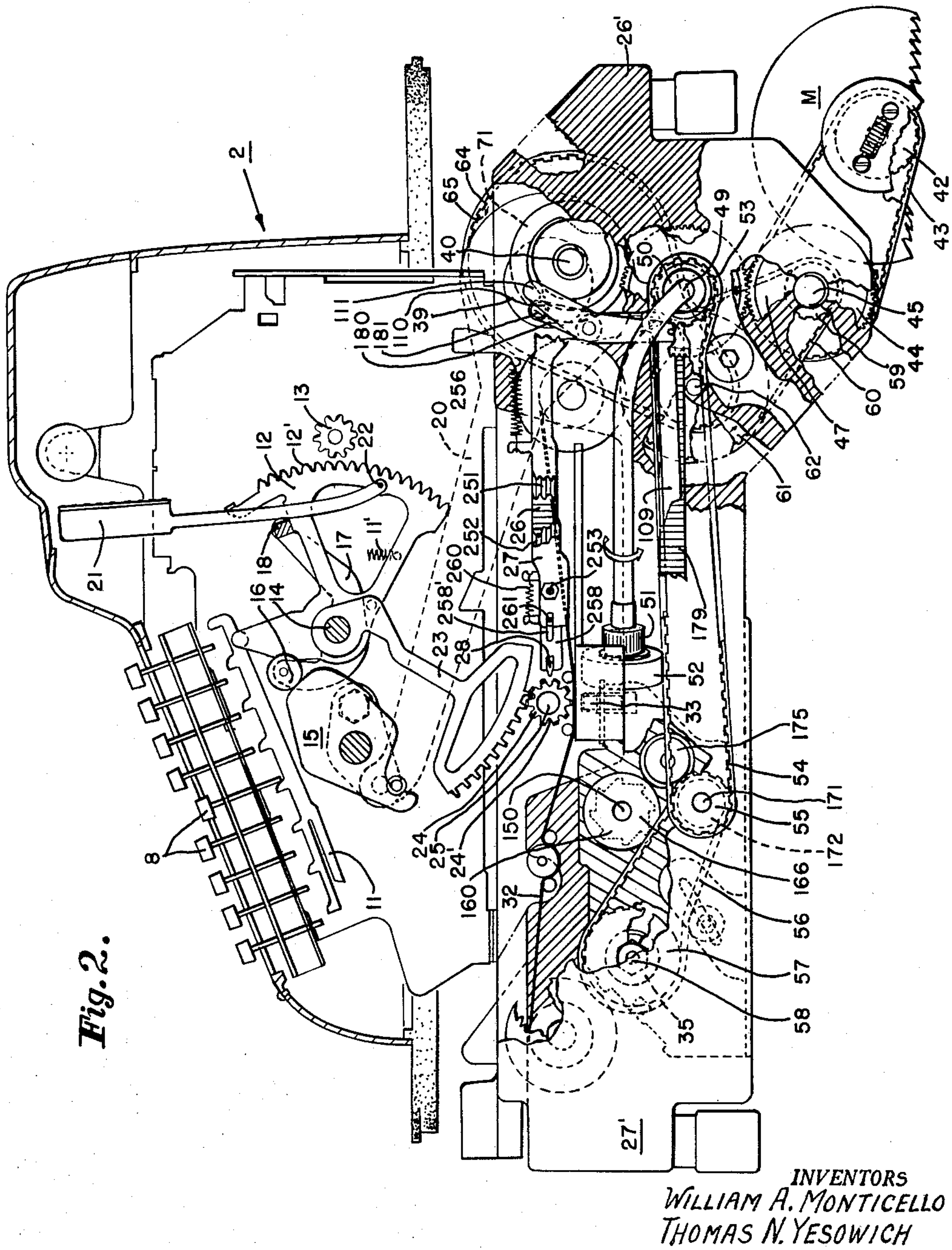
FIG. 2 is a side elevational view partly in section of the apparatus of FIG. 1.

FIG. 2 illustrates a side elevational view of the machine through a column of amount keys 8. Amounts are introduced in the machine in the same manner as in the Burroughs "Series P" machine referred to above, namely by depressing the appropriate amount key in each order which introduces a stop with respect to its index bar 11 to limit the latter's differential movement when the machine is cycled. Each index bar 11 is coupled to an adding sector 12 mounted on a common shaft 14 so that as each index bar 11 is moved forwardly of the machine during a cycle of operation, its respective adding sector 12 will be elevated (i.e. rotated counterclockwise about shaft 14) a proportionate amount. Each of the adding sectors 12, together with its respective index bar 11 coupled thereto, is urged by spring means 11′ in a direction causing the adding sector to occupy an elevated position and the index bar to occupy a forward position, in the view illustrated in FIG. 2. However, such movements are restrained by a cam plate 15 having a cam roller 16 along the outer surface of the cam plate as the latter rotates. Cam roller 16 is carried on one arm of a yoke 17 pivotally mounted on shaft 14, the other arm of the yoke being formed with a bail 18 in engagement with all the adding sectors 12. Spring means (not shown) are provided to urge cam roller 16 against cam plate 15 so that bail 18 will be controlled by the movements of the cam plate.

A pitman 20 is reciprocated during each cycle of the machine from the drive mechanism to oscillate cam plate 15 in one direction during the first half cycle of the machine and to return it during the second half cycle. During the first half cycle, pitman 20 is driven rearwardly, in a manner to be described below, and thereby moves cam plate 15 counter-clockwise, whereupon cam roller 16 is permitted to move downwardly by its springs, and bail 18 in engagement with the adding sectors 12 is moved upwardly, permitting the adding sectors to rise and their index bars 11 to move forwardly until limited by the depressed keys 8 in each order. Thus, adding sectors 12 are each elevated a differential amount corresponding to the value of its respective amount key 8 which was depressed. This differential movement of the adding sectors 12 is transmitted to its respective accumulator mechanism through its teeth 12′ in mesh with the accumulator pinions 13, and is also transmitted to its respective type bar 21 through a coupling 22, so that the type bars are also raised a differential amount depending upon the value of the key depressed in its respective order.

The mechanism is restored during the second half cycle of operation wherein pitman 20 is moved forwardly to its normal position thereby forcing cam plate 15 to move clockwise causing cam roller 16 to rise and its bail 18 to lower. This movement of bail 18 restores the mechanism by driving the adding sectors 12, and thereby the type bars 21 and the index bars 11, to their home positions.

The foregoing structure and operation are well known and are found in the above-mentioned Burroughs "Series P" machine. In the interest of simplifying the description of the present invention, they have been illustrated herein only insofar as is deemed necessary for an understanding of the present invention.

In adapting machine 2 for use in the present invention, an adding sector extension 23 is included with each of the adding sectors 12 of the standard machine. As described above, each of the adding sectors 12 will be moved during each cycle of the machine to a differential position corresponding to the respective amount key 8 depressed, and then will be restored to its normal position. Its adding sector 23, being coupled to that member, will likewise be moved to the proper differential position and then returned during each cycle. Each of the sector extensions continuously meshes with a printing wheel 24 (there being 14 in the machine illustrated), mounted on shaft 25 supported between frame plates 26 and 27 (see FIG. 3). Thus it is seen that printing wheels 24 are also differentially positioned during each cycle of the machine corresponding to the amounts indexed. A bail 28 moves into one of the notches 24′ of all the printing wheels to align them and to lock them in position before printing. The movement of bail 28 into and out of locking position may be effected by any suitable means such as from the main camshaft as to be described.

The present invention, as embodied in the apparatus illustrated, is primarily concerned with the printing of the amounts from printing wheels 24.

Briefly describing the operation of the apparatus, a check C inserted in the feeding chute 5 (FIG. 1) is transported by belt feeding means 29 (see FIGS. 5 and 7) through a guide plate 30 formed on check table 30′ to a position underlying printing wheels 24. The check is halted in this position by a stop mechanism 31 (see FIG. 5) which is raised into the path of the check to intercept it in position under the printing wheels 24. Underlying the printing wheels is an impression producing mechanism for applying a hammer impact to force the check against the printing wheels and to thereby produce an impression of the amounts set up on the printing wheels. These amounts are printed on the check by means of an ink ribbon 32 passing between the printing wheels 24 and the check C.

The impression producing or printing mechanism will be described below in more detail but generally includes an interposer 33 for each of the printing wheels 24. Printing from the printing wheels is effected by raising interposers 33 at the proper time in the machine cycle to press the check against the ink ribbon 32 and the printing wheels 24. After the check is thus positively immobilized, the interposers are struck by their respective hammers 34 driven from a hammer drive roll 35.

In the apparatus illustrated, there are 14 printing wheels 24 and therefore 14 interposers 33 (FIG. 7) and 14 hammers 34. The first printing wheel is used for applying a selected starting symbol (for example, for identifying whether the digital information to follow is an amount or an account number), the next 10 printing wheels for applying the amount information introduced by amount keys 8, the next one for applying a stopping symbol, and the last two for applying coding symbols introduced by Columns A and B Symbol Keys 9 and 9′, respectively, for identifying highly active accounts, for example.

The arrangement is such that only the interposers 33 in those orders which are to print are permitted to be raised into contact with the check. Also, only the hammers 34 in those orders which are to print are released to strike their respective interposers and to thereby effect a printing from the printing wheel. For example, it may be desired to suppress printing from one or both of the printing wheels for Columns A and B Symbol Keys 9 and 9′. These, as well as many other selective operations, are controllable by a programming device generally designated as 36 in FIG. 5 which responds to the depression of certain keyboard keys for effecting predetermined operations. The program assembly positions a plurality of code disks 37 which have notches 38 according to a predetermined coding arrangement for controlling the impression producing or printing means in accordance with the specific operation. All this will be more fully described below.

*Drive mechanism*

As so far described, the parts that are power-driven include the check feeding belts 29 and the hammer drive roll 35. Both are continuously driven whenever the apparatus is turned on. Power is also required to cycle the machine and to control certain operations during its cycle. As described above, pitman 20 is moved rearwardly during the first half cycle of the apparatus, and is returned during the second half cycle to drive the mechanism of the adding machine unit 2. For this purpose, pitman 20 is secured to an eccentric 39 fixed to camshaft 40 (see FIG. 4) so that it is reciprocated during rotation of the camshaft. Besides cycling the adding machine unit 2, camshaft 40 also controls the various operations to effect printing from printing wheels 24 during a cycle of the machine, as will be described below. Camshaft 40 is thus coupled to the drive mechanism so that it is rotated one complete revolution during each cycle of the apparatus.

The drive for all the power-driven units is derived from an electric motor M located at the left, rearward side of the apparatus. As shown particularly in FIG. 4 which is a view looking from the left rearward side, motor shaft 41 is secured to a toothed pulley 42 which is coupled by a belt 43 to another toothed pulley 44 fixed to shaft 45. The latter shaft passes from the left side of the machine through the left frame plate 26′ and also the right frame plate 27′ to the right side and is there fixed to a gear 47 in mesh with another gear 48 fixed to a shaft 49 journaled on the right frame plate 27′. Shaft 49 is connected by a flexible coupling 50 to another shaft 51 which terminates in the feeding belt drive roll 52. Thus, the feeding belt drive roll will continuously be driven all the while motor M is operating. Shaft 49 is also provided with a toothed pulley 53 transmitting power therefrom by belt 54 to toothed pulley 55, which in turn is fixed to another shaft and pulley (171 and 172 respectively, FIG. 5, to be described later) connected by belt 56 to toothed pulley 57 fixed to shaft 58 of the hammer drive roll 35. Thus the latter roll will also be continuously driven while motor M is operating.

Shaft 45, which transmits the power to the feeding drive rolls 52 and the hammer drive roll 35, also includes a toothed pulley 59 coupled by belt 60 to another toothed pulley 61, the latter being fixed to a shaft 62 carrying a smaller diameter toothed pulley 63 coupled by another belt 64 to a further toothed pulley 65. The latter is coupled to camshaft 40 by a single-cycle spring clutch, generally designated 66, which is effective to cycle camshaft 40 one revolution during each cycle of the machine.

Clutch 66 is controlled by a solenoid S1 having an armature 67, which, when operated, effects a coupling between toothed pulley 65 and camshaft 40. That coupling is automatically disengaged after a single cycle of revolution.

Figure 4:
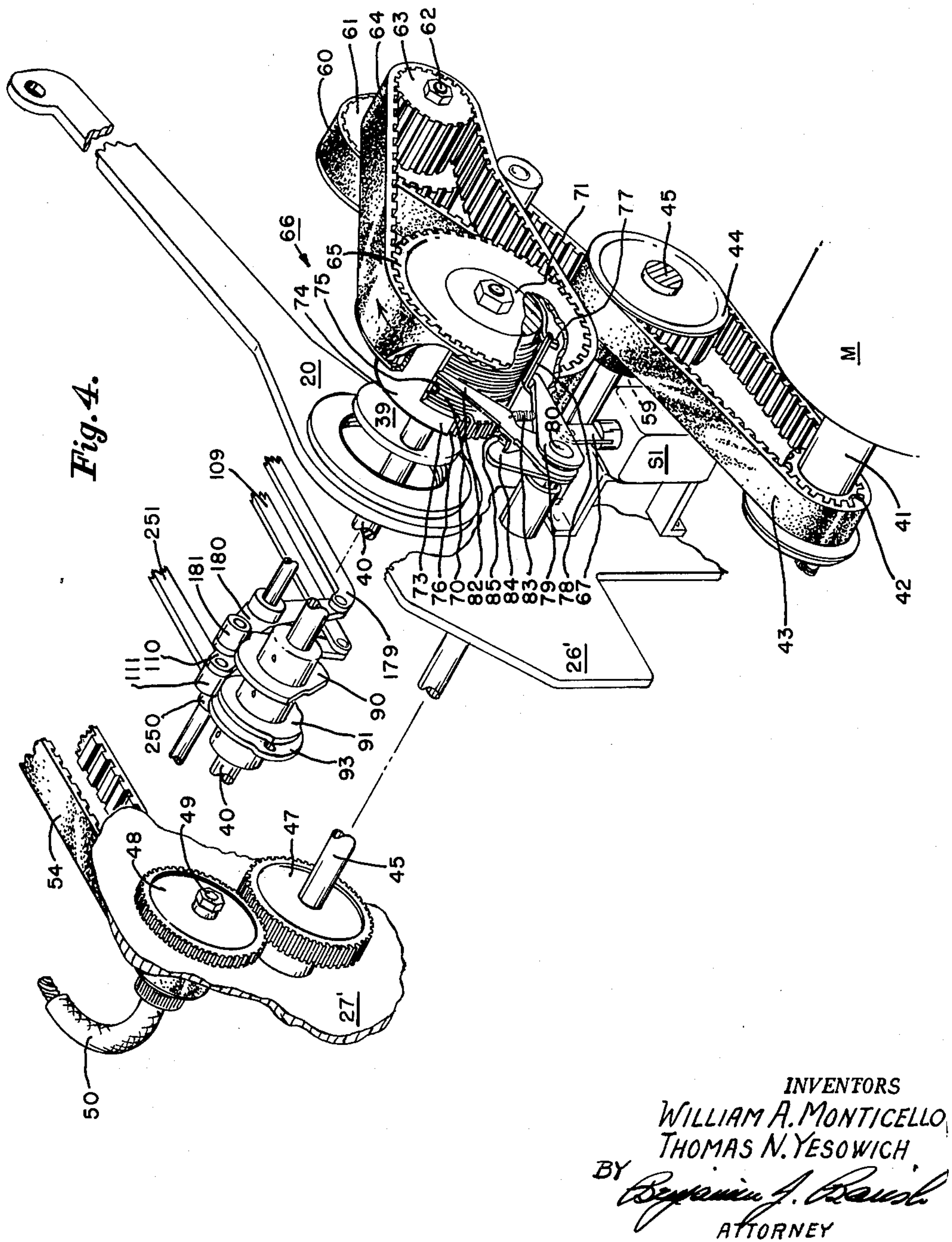
FIG. 4 is a perspective view looking from the upper lefthand side of FIG. 3 to more clearly show the drive mechanism.

The single-cycle spring clutch illustrated is quite similar to those that have heretofore been used, for example, as illustrated in FIG. 17 of Patent No. 2,881,895. It includes a pair of longitudinally spaced drums co-axially disposed in side-by-side relationship and spanned by a torsion spring 70 which normally is in its contracted state and tightly grips both drums to effect a coupling. Toothed pulley 65 is fixed to drum 71 of the pair. Camshaft 40 is fixed to the other drum (underlying the leftward part of spring 70 in FIG. 4), so that the camshaft is driven by the toothed pulley when spring 70 is effective to couple the two together. The latter drum is secured to the camshaft through side plate 73 which carries a cap 74 disposed between and spaced from toothed pulley 65 and its drum 71, the cap being formed with a cut-out 75 for about one-fourth its circumference for a purpose to be described. Spring 70 is disposed between the two drums and cap 74, and a part of it is exposed through cut-out 75 as can be seen in FIG. 4.

One end of spring 70 is fixed to one of a plurality of adjusting notches 76 in side plate 73 of the driven member, and the other end is turned up to form a lip at 77 so as to be engageable by an arm 78 carried by a lever 79 linked to the solenoid armature 67 and pivotable downwardly about pin 80 when the solenoid is operated. In its normal position, arm 78 engages the lip 77 of the spring and maintains the spring in its expanded condition such as to have it decoupled from the drum of pulley 65. When solenoid S1 is actuated, its armature 67 pulls down lever such as to remove arm 78 from engagement with lip 77 of the spring thus permitting the spring to contract and to tightly grip the drum 77 of pulley 65 and the drum (not shown) of the camshaft 40 and thereby couple the camshaft to the drive.

During the cycling of the machine, solenoid S1 would normally return its armature 67 to cause arm 78 to intercept lip 77 of the spring, thereby to decouple driven camshaft 40 from pulley 65, thus assuring that the latter will operate only for a single cycle. However, means are provided for more positively assuring that the spring 70 will decouple the members after a single cycle of operation.

This means includes a feeler arm 82 pivotably mounted on pin 80 and biased towards lever 79 by spring 83. Feeler arm bears on cap 74 if the driven drum assembly by spring 83, and would therefore extend through the cut-out in the normal position of the driven assembly and would rest on coupling spring 70. There is also provided on pin 80 another arm 84 fixedly connected to lever 79, the arm 84 having a transversely extending lug 85 normally spaced from feeler arm 82 when the latter rests on the surface of the coupling spring 70 within the cut-out 75, but when the driven member is rotated so as to clear the cut-out from the feeler arm the latter is pivoted counterclockwise (as shown in FIG. 4) and engages lug 85 to pivot its arm 84 and thereby lever 79 and arm 78 connected thereto. This pivotable movement of arm 78 repositions it into the path of lip 77 of spring 70 so as to intercept the lip when it returns to the starting position. This expands spring 70 and thereby decouples the two drums. The inertia of the driven member causes it to coast somewhat past the normal stopping point, but this further expands the spring 70, and the energy thus stored immediately returns the driven member to the proper starting point. During this slight return movement of the driven member, feeler arm 82 engages the edge of the cut-out portion, as illustrated in FIG. 5, and thereby assures that the driven member will not over-travel in the opposite direction.

It is thus seen that camshaft 40 will be rotated one, and only one, complete revolution when the apparatus is cycled by pulsing solenoid S1. Eccentric 39 is secured on this camshaft and operates pitman 20 to cycle the adding machine unit 2 as described above.

Camshaft 40 also carries a pair of cams 90 and 91 which effect the printing from printing wheels 24 and also effect control of the printing so that impression forces will be applied with respect to only those printing elements in which printing is programmed to occur. Camshaft 40 carries two further cams, cam 92 which controls the stop 31 to intercept and to register the check, and cam 93 which controls bail 28 to align the printing wheels before printing. These mechanisms are described below.

*Printing mechanism*

The printing mechanism is illustrated particularly in FIGS. 5, 6 and 7. As indicated above, it includes 14 interposers 33 each underlying one of the printing wheels 24. Referring particularly to FIG. 5 illustrating but one of the interposers cooperable with one of the printing wheels, it is seen that the interposers are slotted at 100 and are supported by a square shaft 101 passing through said slots. A compression spring 102 is inserted in the slot 100 of each of the interposers and engages shaft 101.

Shaft 101 is carried between a pair of arms 103 and 104 of bellcranks 105 and 106, respectively, fixed at opposite ends of a rock shaft 107. The leftmost bellcrank 105 has another arm 108 coupled to link 109. The latter link is connected at one end to link 110 which carries on its opposite end a cam roller 111 riding on the surface of cam 91 rotated by camshaft 40 (FIGS. 3 and 4*a*). It is thus seen that during the cycling of the camshaft, link 109 is moved rearwardly of the machine (counterclockwise about the axis of rock shaft 107, FIG. 5) thereby raising square shaft 101. The latter shaft, since it passes through the slots 100 of all the interposers, will tend to raise such interposers to press the check C against the ink ribbon 32 and printing wheels 24. As will be described below, however, certain of the interposers 33 may be restrained from being lifted by shaft 101, depending upon the programmed printing control mechanism for the particular operation, and when so restrained, their springs 102 become compressed to take up the displacement of shaft 101 within slot 100 of the interposer.

After the interposers 33 have been raised by shaft 101 (i.e. except those that have been restrained as to be described below) to press the check C against the printing wheels, and thus to positively immobilize the check, the raised interposers are then struck by their respective hammers 34 driven from hammer roll 35. Each of the hammers (there being 14, one for each of the interposers and printing wheels) is pivotally mounted on a shaft 115 and limits against another shaft 116 in its normal position of rest. Each of the hammers is formed with a hammer arm 117 engageable with a hammer shoe 118 having a serrated cam segment 119 cooperable with the hammer drive roll 35, such that when the cam segment, which is normally spaced from the drive roll, is moved to engage the drive roll, it drives the hammer upwardly (counterclockwise about shaft 115 in FIG. 5) causing it to strike the lower surface of its respective interposer.

A slide 122 having an up-turned nose 123 is provided for each of the hammers and controls the firing of its respective hammer. The slide is in turn controlled by the printing control mechanism to be described below which determines whether or not a particular hammer will fire, but for purposes of the instant description, it will be seen that whenever slide 122 is permitted to move forwardly, its nose 123 will engage nose 124 formed on the upper end of hammer shoe 118, and will tend to pivot same about shaft 115 until its cam segment 119 engages the hammer drive roll 35. In other words, whenever slide 122 moves forwardly, it will cause its hammer to fire, the means for controlling the movement of slide 122 being described below in connection with the printing control mechanism.

The arrangement between the hammer shoe 118 and its respective hammer 34 is such that when cam segment 119 is engaged with the drive roll 35, the hammer shoe positively drives the hammer only part of the way to the interposer, the hammer continuing by its own momentum the rest of the distance until it strikes the interposer. After impact, the hammers 34 tend to return by gravity to their normal positions, resting against limit shaft 116, but are intercepted and latched in an intermediate position by a latching plate 130 for each hammer engageable with an in-turned lug 131 formed on the hammer arm 117. A spring 132 is connected between each hammer arm 117 and the end of its hammer shoe 118 such as to maintain the cam segment 119 spaced from the hammer drive roll whenever the hammer is latched in this intermediate position. Thus, once the hammer has fired in any machine cycle, it will not be able to return to its home position where it may possibly fire a second time during the same cycle of the machine.

Means are provided for restoring the hammers to their home positions against limit shaft 116 towards the end of each cycle after the possibility of re-firing has passed. This means is operated from bellcrank 106 which supports on its arm 104 one end of the interposer lift shaft 101. A link 133 is secured to the other arm 134 of bellcrank 106 and is coupled to one arm 135 of another bellcrank 136 pivoted on a shaft 137 supported by the right frame plate 27. Shaft 137 also supports the hammer latches 130 for all 14 hammers. The opposite ends 138 of the hammer latches are biased by springs 139 tending to maintain the latch in an upward position for engagement with the lug 131 of its respective hammer, and thereby to latch its hammer in the intermediate position. The second arm 140 of bellcrank 135 supports shaft 141 and moves the latter upwardly whenever link 133 is moved forwardly of the machine. The other end of shaft 141 is supported by a link 142 fixed to and pivotal with the shaft. As will be seen, when shaft 141 moves upwardly, it pivots all the latches 130 about shaft 137 so as to disengage therefrom the lugs 131 of the hammer arms, thus permitting all the hammers to return to their normal positions against limit shaft 116.

Thus, whenever shaft 101 is operated to lift the interposers 33, at the same time link 133 will be operated by bellcrank 106 to move rearwardly of the machine, thus lowering shaft 141 and enabling all the latching plates 130 to be urged into latching position by their respective springs 139. Towards the end of the machine cycle, however, when shaft 101 is operated to lower the interposers, link 133 is moved forwardly of the machine thereby causing shaft 141 to move upwardly, hence to rock all the latches 130 to disengage the hammers and to permit them to restore against limit shaft 116.

*Printing control*

As briefly referred to above, the apparatus includes printing control means to permit only the interposers 33 in those orders which are to print to be raised into contact with the check, and only the hammers 34 in those orders which are to print to strike their respective interposers. This is controlled by programming device 36 which responds to the depression of certain keyboard keys to position the plurality of code disks 37. The latter disks are secured to a shaft 150 which is moved during a machine cycle to the predetermined position for effecting the desired printing. The apparatus illustrated has a capability of eight printing control programs, and therefore shaft 150 may assume any one of eight different positions to effect such controls.

The means for positioning shaft 150 includes a stationary switch plate 151 and a rotatable switch wiper assembly 152. As shown in FIG. 8, stationary switch plate 151 includes nine fixed contacts, each of which is connected to a terminal 153 by a conductive lead 154. Eight of the contacts, 155, are arranged in a circular array about shaft 150 and represent the eight program positions. The ninth contact, 156, is a common contact and is circular in form disposed between shaft 150 and the other eight contacts 155. For ease in manufacturing, stationary switch plate 151 may be formed by conventional printed circuit techniques.

The rotatable switch wiper assembly 152 includes a wiper disk 160 having a pair of contacts 161 and 162 electrically connected together by a conductive segment 163. The inner contact 161 wipes common contact 156 of the fixed contact assembly, and the outer contact 162 successively wipes the remaining eight contacts 155, such that one of the latter contacts will be electrically connected to the common contact 156 depending upon the position assumed by the rotatable wiper assembly 152.

The rotatable disk 160 illustrated in FIG. 8 also includes a further wiper arm 164, but this does not complete any electrical connections and is provided merely to balance the rotatable wiper disk during rotation. The disk is rotated through its knurled surface 160′ as will be described below.

The rotatable switch wiper assembly 152 also includes a stepped disk 165 having eight steps, one for each program position, and an end disk 166. This assembly is rotatably mounted on a bushing 150′ carried by stationary switch plate 151, the coding disk shaft 150 extending through the bushing and the switch plate. The end disk 166 is fixedly secured to shaft 150 and is formed with a pin 167 which seats in a hole 168 in the stepped disk so that end disk 167, stepped disk 165 and wiper disk 160 all will be rotated as a unit with coding disk shaft 150.

Means are provided for rotating the wiper assembly 152 from a knurled roll 170 mounted on shaft 171 driven from the main drive mechanism by toothed pulley 172. The drive for the wiper assembly is effected through an intermediate knurled roll 175 which normally is out of engagement with drive knurled roll 170 and the knurled surface 160′ of the rotary wiper disk 160 but is moved at the proper time in the machine cycle to couple knurled roll 170 to the knurled surface of the rotary wiper disk. For this purpose, intermediate roll 175 is supported by a bail 176 freely mounted on a shaft 177 such as to normally be ineffective to couple roll 170 to rotary disk 160. At the proper part of the cycle when the coupling is to be effected, shaft 167 is rocked clockwise, as shown in FIG. 5, by a link 178 secured to one end thereof and coupled at its opposite end to another link 179 connected to link 180 carrying cam roller 181 acting on cam 90 fastened to the main camshaft 40 (see FIGS. 3 and 4*a*). At the end of rock shaft 177 proximate to the rotatable wiper assembly, there is provided an arm 185 fixed to shaft 177 so as to be rocked thereby when the latter is moved by the main camshaft in the manner described above. A rock plate 186 is pivotably mounted at 186′ to a stop plate 187 (to be described below), and carries a stud 188 passing therethrough such that one side of the stud extends to be engageable by bail 176 and the other side of the stud extends to be engageable by arm 185. The foregoing arrangement is such that when shaft 177 is rocked clockwise during its machine cycle, arm 185 engages stud 188 of rock plate 186 to rock same about pivot 186′ and to move bail 176 therewith, and thus to move intermediate roll 175 carried by the bail into engagement with both the drive roll 170 and the knurled surface 160′ of the wiper disk 160. Thus, at the predetermined time in the machine cycle, wiper assembly 152 will be rotated to wipe the contacts of the stationary switch plate 151, and in so doing will also rotate shaft 150 to rotate the coding disks 37 carried by said shaft.

Means are provided for arresting the rotation of shaft 150 at the predetermined position for its coding disks 37, and this means is controlled by the keyboard keys depressed, which operate electrical switches to control the circuitry to the rotatable switch arrangement described. The circuitry for accomplishing this is fully described below in connection with the complete circuit description, wherein it will be seen that solenoid S2 is energized at the instant the rotary wiper disk 160 is in its predetermined position. When the solenoid is thus energized, it pulls in its armature 190 which rocks stop plate 187 about its pivot 191, the stop plate being normally biased in the opposite direction by a spring 192 fastened to the frame. When stop plate 187 is so rocked by the solenoid, a stop dog 193 formed on plate 187 is moved to seat on one of the steps of the stepped disk 165 and thereby to arrest its further rotational movement. Stop plate 187 is also formed with another arm 194 which carries the pivot 186′ for rocking plate 186. As will be seen from FIG. 5, when stop plate 187 is rocked by the solenoid, its arm 194 is lowered such that stud 188 of the rock plate will clear arm 185 of shaft 177, thereby removing the force stud 188 applies to bail 176 and intermediate roll 175 thereby decoupling the latter roll from drive roll 170 and the rotary wiper assembly. Thus, when solenoid S2 is energized, dog 193 of plate 187 will be effective to arrest the rotational movement of the wiper assembly, and arm 194 of plate 187 will be effective to disconnect the coupling of that assembly with drive roll 170. Shaft 150 carrying the coding disks 37, being coupled to the wiper assembly through end disk 166, is thus properly positioned in one of the eight program positions, the particular position depending upon the keyboard keys depressed as will be more fully described below.

There are 14 coding disks 37, one for each of the printing wheels. Each of the coding disks determines whether its respective interposer 33 will be elevated to press against the check and whether its respective hammer 34 will be fired to cause printing from its respective printing wheel 24. All this is dependent upon whether the coding disk assumes a position whereby it presents a notch 38 or an unnotched surface to certain mechanisms which senses this position and thereby controls the interposer and the hammer. If the notch is present, its interposer will rise and its hammer will fire during the machine cycle; whereas if no notch is present, its interposer will be restrained from rising and its hammer will be restrained from firing. The specific mechanism for accomplishing this is described more fully below.

The 14 coding disks 37 are divided up as follows, specific reference being made to FIG. 9 which illustrates their configuration for the particular program set-up shown. The rightmost disk, **37*a*, cooperates with the printing control mechanism associated with the rightmost printing wheel 24, which prints a starting symbol. Next, there are 10 coding disks 37*b*–37*k* which cooperate with the printing control mechanism associated with the ten columns of amount printing wheels. The next coding disk 37*l* is allotted to the next printing wheel which prints a stoping symbol. The next coding disk 37, is allotted to the printing wheel for the Column A Symbol Keys 9 which prints a code symbol depending upon which of the keys in that column is depressed. The last coding disk 37*n* is allotted to the printing wheel for Column B Symbol Keys 9′** which may be used to print a further coding symbol.

As briefly discussed above, the apparatus illustrated is capable of being programmed for eight different printing control operations, one for each of the eight steps in stepped disk 165. For purposes of simplifying the present description, only three of the programs are used in the embodiment illustrated. One program, which we will call program A, is effected when a key 9′ in the Column B Symbol Keys is depressed. In this program all 14 orders will print. Program B is effected when a key 9 in the Column A Symbol Keys is depressed but no key 9′ in the Column B Symbol Keys is depressed. In this program B, all columns will print except the last one controlled by coding disk **37*n*. The third program, program C, is effected when none of the keys 9 or 9'** in either Column A or Column B of the Symbol Keys is depressed. In this program, all orders will print except the last two relating to the Columns A and B Symbol Key printing wheels.

As brought out earlier, which program is effective depends upon which one of the eight possible rotational positions shaft 150 is arrested. The eight positions are illustrated schematically in the circuit diagram of FIG. 11, wherein the terminals 153 in FIG. 11 are numbered *a–h* to correspond with the eight positions represented by contacts 155 which shaft 150 may assume.

Reference is now made to FIG. 9 which illustrates the configuration of all the coding disks 37, and also illustrates the eight positions *a–h* assumable by shaft 150 to effect any one of the eight possible programs.

As discussed above, in program A all 14 wheels will print, and therefore a notch 38 is formed in the surfaces of all of the coding disks corresponding to position *a*. In program B all printing wheels will print except the last one, and therefore a notch 38 is formed in the surfaces of all the coding disks corresponding to position *b*, except the last disk **37*n*. In program C, all printing wheels will print except the last two, and therefore a notch is formed in all of the coding disks 37*a*–37*l*, but not in the last two, 37*m* and 37*n***.

The remaining areas represented by positions *d–h* are not actually used in programming the particular apparatus disclosed. They are retained unnotched so that they may readily be notched when further programs are desired. Also, being unotched, they will prevent printing should shaft 150 assume a position other than those of positions *a–c*, through some malfunction.

The manner in which the keyboard keys that are depressed determine the position shaft 150 will assume, and thereby which of the programs will be effective, is described more fully below particularly with respect to the electrical circuit description.

The mechanism which senses the position of the coding disks and thereby controls printing includes, for each interposer assembly, a slide plate 200 having a nose 201 at one end thereof in line with the notch 38 of its coding disk, assuming its notch is in position. The other end of the slide plate 200 is formed with a catch 202 normally seated in a recess 203 of its respective interposer, the arrangement being such that if a notch in coding disk 37 is presented to nose 201 of slide plate 200, when the latter moves (forwardly of the machine), its catch 202 clears recess 203 of its interposer. It will thus be seen that those coding disks which present a notch to their side plate 200 will permit their respective interposers to rise when lifted by shaft 101, whereas those coding disks which do not present a notch, will in effect restrain their respective interposers from rising.

Each slide plate 200 is normally biased by its spring 204 to engage its coding disk, but is restrained from such engagement by a bail 205 until the predetermined time in the machine cycle when the bail moves forwardly. Bail 205 is carried between a pair of arms 206 and 207 pivotally mounted on a shaft 208, the terminal ends of the arms being formed with cam surfaces 209' and 210' normally engageable with stud 206' on arm 206 and stud 207' on arm 207. As will be recalled from the preceding description, shaft 177 is rocked clockwise during the machine cycle by link 179, etc., acting on cam 90 of camshaft 40. When so rocked, cam surfaces 209' and 210' will eventually clear studs 206' and 207' which will permit bail 205 to move forwardly under the influence of springs 204 of slides 200. This movement of bail 205 permits the slides for all the interposers to move forwardly, if permitted by their respective coding disks 37, and thereby enables the interposers to rise at the proper time in the cycle, all as described above. Bail 205 is restored to its normal position when shaft 177 is restored, as determined by cam 90 of the camshaft, and when so restored it positively moves all the slide plates 200 to their initial blocking positions.

The movement of slide plates 200 determines not only whether their respective interposers 33 will be permitted to rise but also determines whether their hammers 34 fire to strike their interposers. For this purpose, slide 122, which was previously disclosed as controlling the firing of the hammer when it moves forwardly, includes a depending arm 211 carrying a stud 212 located to the rear of nose 201 of slideplate 200. Slide 122 is normally biased in the forward direction to fire its hammer in the manner described above, but is restrained in part by nose 201 of slide plate 200. Accordingly, those coding disks 37 which present a notch 38 to their respective slide plates 200 and thereby permit the latter to move forwardly at the proper time in the machine cycle, not only remove the block against their interposers from rising, but also enable their hammers to fire.

Means are provided for controlling the instant the hammers will fire so as to enforce their striking their interposers after the interposers have been raised. The latter means includes previously discussed bail 205 which controls half the hammers, and another bail 215 carried by a pair of upstanding arms 216 and 217 on each of the slides 122, the latter bail controlling the other half of the hammers.

Bail 215 is supported on the same shaft 208 as bail 205. Rock shaft 177 which controls the movement of the latter bail also controls the movement of bail 215. For this purpose, shaft 177 includes another pair of arms 220 and 221 having terminal camming surfaces 220' and 221' which bear on studs 222 and 223 respectively at opposite ends of bail 215 so that when shaft 177 is rocked clockwise, the camming surfaces 220' and 221' clear studs 222 and 223 of bail 215, thus releasing this block from slides 122. Camming surfaces 220' and 221' operating on bail 215 are slightly longer than the camming surfaces 209' and 210' of arms 209 and 210 operating on bail 205, so as to cause bail 215 to move forwardly at a short time (about 15° in the machine cycle as will later be explained) after bail 205. This is to enable bails 205 and 215 to control the hammers in a manner so that the hammers are not all fired in the same instant, to relieve the load on the hammer drive roll 35. In the arrangement disclosed, half the hammers are released at one instant, and the other half are released at an instant shortly thereafter. To accomplish this, bail 215 is notched at 215' which is that part of its length overlying the seven slides which control the firing of the seven leftmost hammers. This is more clearly shown in FIG. 7. It will thus be seen that the slides 122 for the seven left hammers will move (when permitted to do so by sliding plates 200 as discussed above) with bail 205, before the right seven slides, and therefore their noses will engage the hammer shoes 118 first to cause their hammers to fire before the firing of the seven right hammers. The seven right hammers will be restrained from moving by bail 215 and will then move therewith until they cause their hammers to fire. It will be understood, of course, that bail 215 could be notched in other configurations to control the firing of the hammers in other desired sequences.

*Check positioning*

As indicated earlier, camshaft 40 includes a cam 92 which controls the stop 31 at the proper time of the cycle to intercept and to register the check in proper position before printing.

The check stop mechanism is shown particularly in FIG. 5 wherein it is seen that cam 92 drives an arm 230 carrying the cam follower 231 on one end, and a slidable plate 232 on its opposite end such that the latter plate is movable rearwardly and then forwardly of the machine during its cycle as will be described below. Slidable plate 232 pivots an arm 233 which is fastened to a rock shaft 234 having another arm 235 connected at its opposite end. The latter arm bears against a pin 236 formed on stop 31. The stop is carried by a bracket 237 having a stud 238 to which a spring 239 is connected, the opposite end of the spring being secured to an ear 240 of the stop 38.

It is seen that with cam 92 in its normal position as illustrated in FIG. 5, stop 31 will be raised to intercept the check. The stop is biased in this raised position by spring 239. During cycling of the machine, cam 92 will rotate arm 230 counterclockwise, driving plate 232 rearwardly of the machine to rotate clockwise arm 233, which thereby rocks shaft 234 counterclockwise to lower arm 235. The latter arm, bearing on stud 236 of the stop mechanism, forces stop 31 downwardly against the bias of its spring 239. At the lowest position of stop 31, it clears the opening in check table 30′ to allow the check to be conveyed to the receiving hopper 6.

The stop mechanism also includes a switch SW1 in which its operator 240 rests against a lug 238 formed on stop 31. The arrangement is such that when stop 31 is in its raised position, lug 238 operating on operator 240 closes switch SW1, but when the stop is in its lower position, the contacts of the switch are open. Switch SW1 is in the electrical circuit to assure that the printing mechanism will not be operated unless stop 31 is in its raised position. The circuit for accomplishing this will be described below.

Means are also provided to assure that the check is registered in its proper position with respect to the printing wheels before printing can occur, these means being as follows:

Adjacent to the leading lower corner of the check as it is intercepted by stop 31, the check table 30′ is formed with a small circular opening 242 which is in the optical system between a light source L2 and a photo-cell circuit 244 (see FIG. 11). Opening 242 would be covered by the check when the latter is properly positioned against the stop, and accordingly would block photo-cell circuit 244 from the light emanating from light source L2. This optical circuit thus senses the leading lower corner of the check to assure it is in proper position, and if not, it will permit light from L2 to fall on the photo-cell of circuit 244. This will block the operation of the apparatus in the manner to be described below.

Skew is detected by another optical circuit including a light source L1, a slot 246 in guide plate 30, and photo-cell circuit 248. Slot 246 is provided parallel and adjacent to the lower edge of the check proximate to its trailing edge, so that if the check is skewed, it will not cover slot 246. This will block operation of the apparatus in the manner to be described below.

*Printing wheels alignment*

As also indicated earlier, camshaft 40 includes a further cam 93 which controls bail 28 to align the printing wheels before printing. This is most clearly illustrated in FIG. 3, wherein it is seen that cam 93 cooperates with cam follower 250 secured to an arm 251 at one side of the bail assembly. Arm 251 is coupled to another arm 252 by a cross-bar 253 such that cam 93 will positively drive both arms toward the printing wheels 24 tending to seat bail 28 into the wheels, thereby aligning and locking same before printing. Arms 251 and 252 are slotted (not shown) to straddle cross-bar 254 extending between frame plates 26 and 27. Springs 255 and 256 fastened between the arms and bar 254 bias the arms to their normal positions wherein the bail is out of engagement with the printing wheels.

Aligning bail 28 is wedge-shaped (see FIG. 2) and is carried by a further pair of arms 257 and 258 yieldingly coupled to arms 251 and 252. Arms 257 and 258 are coupled to the positively driven arms 251 and 252 through a yielding connection, namely springs 259 and 260 fastened respectively between arms 251, 257 and arms 252, 258. Arms 257 and 258 are similarly slotted (at 258′, FIG. 2) and straddle a cross-bar 261 extending between arms 251 and 252.

The arrangement is such that cam 93 drives arms 251 and 252 to move bail toward the printing wheels 24 against springs 255 and 256. However, should bail 28 seat on a high point in one or more printing wheels, springs 259 and 260 will yield so as not to bind the apparatus.

*Electrical circuit*

FIG. 11 illustrates the electrical circuit for the system insofar as it is described above. In that figure, the contacts, and their operating elements when illustrated, are shown in a normal conditon they would occupy to complete the necessary circuits for effecting a typical operation of the apparatus. The illustrated condition of the circuit elements is such as to control printing in accordance with program C of the above described programs.

Motor M is connected through a manual switch MS directly across the power source, lines 300 and 301, since it is continuously operated whenever the power is turned on as described above.

A relay RC having two pairs of contacts RC1 and RC2 is connected through lead 302 to line 300 of the power source. The other side of the relay is connected by lead 303, through switch SW1, to a gas tube T2 and thenceforth through lead 304 to line 301 of the power source.

Tube T2 is in the corner detection circuit which includes light source L2, opening 242 and photo-cell 244. As will be recalled from the preceding description, when the corner of check C is in proper position, it covers opening 242 so that the light from source L2 cannot impinge on the photo-cell of circuit 244. Tube T2 normally conducts when no light falls on that photo-cell. However, if the corner of the check is not properly positioned, the light from lamp L2 falling on the photo-cell of circuit 244 will produce a negative signal which is impressed on the control grid of tube T2 to extinguish the tube and thereby to de-energize relay RC.

Relay RC is illustrated in FIG. 11 with its contacts closed, such as would be the case when the relay is energized. Contacts RC1 and RC2 must be closed to complete the various circuits as will be described, and it is thus seen that these contacts can be closed only when the corner of the check is in its proper position.

Switch SW1 is also in this circuit, being interposed between relay RC and tube T2. It will be recalled that switch SW1 is controlled by check stop 31 such that when the check stop is in its raised position, its lug 238 maintains switch SW1 closed, but when the stop is in its lowered position, lug 238 moves downwardly to the position shown in dotted lines in FIG. 11 and thereby opens switch SW1. It is thus seen that whenever check stop 31 is in its lowered position, relay RC cannot be energized, and therefore its contacts will be open to prevent completion of the various operating circuits as will be described.

Skew detection and control is effected through photo-cell circuit 248, gas tube T1, and relay RS. The latter relay is connected to line 300 of the power source through lead 305. The other side of the relay is connected through contacts RC1 of relay RC, and lead 307 to tube T1, and from there to lead 304 and then line 301 of the power source. The operation of the skew detection circuit is similar to that for corner detection. Namely, when slot 246 is covered, as would be the case when the check is in proper position, it blocks the light from lamp L1 from impinging on the photo-cell of circuit 248. Gas tube T1 normally conducts under such condition to energize its relay RS and to maintain the latter's contacts RS1 in the illustrated closed position. However, should slot 246 not be covered by the check, a negative signal will be produced in photo-cell circuit 248 by the light from lamp L1, and will be impressed on the control grid of tube T1 to extinguish the tube, to de-energize relay RS, and thereby to open contacts RS1. It will also be appreciated from the circuit illustrated that should relay RC of the corner detection circuit not be energized, its contacts RC1 would be opened, and thereby relay RS would also be de-energized and its contacts RS1 opened.

Photo-cell circuits 244 and 248 and the tubes which they control, T2 and T1 respectively, may be of any suitable design, an ample number of which are known in the art.

As will be fully described below, contacts RS1, RC1 and RC2 must all be closed, as illustrated, before the apparatus will be cycled and before printing will be effected from the printing wheels 24. From the foregoing discussion it is seen that these contacts cannot all be closed if the stop 31 is not properly in its raised position, or if the check is not properly positioned to cover both hole 242 and slot 246.

FIG. 11 also illustrates the circuitry of the printing control means for enabling only the interposers 33 in those orders which are to print from printing wheels 24 to be raised into contact with the check C. As will be recalled, this is controlled by a programming device which includes the plurality of code disks 37 mounted on shaft 150, the latter shaft being rotated and then arrested in a predetermined position for aligning the notches 38 of the code disks in a predetermined pattern to effect the desired controls. Accordingly, the control will depend on the rotational position of shaft 150. As will be further recalled, this position is determined by energizing solenoid S2 at the appropriate instant to enable its stop plate 187 to engage stepped disk 165 secured to shaft 150. In the embodiment illustrated, disk 165 has eight steps, one for each of eight possible positions, and is therefore capable of controlling the apparatus according to eight different programs. However, for simplification purposes, only three programs are actually used in the embodiment illustrated.

It will further be recalled from the foregoing description that wiper assembly 152 is rotated with shaft 150 and successively bridges, by means of its contacts 161, 162, and 163, the eight contacts 155 (one for each program position) with the common contact 156 of the stationary switch plate 151. Each of the contacts 155 is connected to a terminal *a–h* and represents one of the eight potential programs. As seen in FIG. 11, only three of the terminals, *a*, *b* and *c* representing programs A, B and C have connections since only three of the eight programs are actually used here.

With respect to the illustrated circuit used for controlling the position of shaft 150 and therefore the program for printing, it is seen that a switch SW4, operatively associated with the amount keys 8, is connected by lead 310 to line 300 of the power source. Switch SW4 is normally open, but is closed whenever any one of the amount keys 8 is depressed as shown in FIG. 11. Switch SW4 is connected through contacts RC2 of Corner Relay RC, lead 311, contacts RS1 of Skew Relay RS, lead 312, the contacts of switch SW3, lead 313, and finally to switch SW6. The latter is a single-pole double-throw switch having a movable contactor engageable with its upper contact SW6–1 or its lower contact SW6–2. The former contact is connected through lead 314 to another single-pole double-throw switch SW5 also having two selectively engageable contacts, an upper one SW5–1 and a lower one SW5–2. Contact SW5–1 is connected by lead 315 to terminal *c* of the stationary switch plate 151; contact SW5–2 is connected by lead 316 to terminal *b* of the stationary switch plate; and contact SW6–2 of switch SW6 is connected by lead 317 to terminal *a* of the stationary switch plate 151.

As described above, switch SW4 will be closed only when at least one of the ten columns of amount keys 8 is depressed to enter an amount into the adding machine unit 2 of the apparatus. It was further brought out above that contacts RC2 and RS1 will both be closed only when check C is in proper position and stop 31 is raised. Thus, when all the foregoing conditions are present, the above-described circuit will be completed up to switch SW3.

Switch SW3 is controlled from the Item Key 10′ of the Operation Control Keys 10, it being recalled that the operations of the apparatus described are dependent upon the Item Key being depressed. Thus, the depression of this key as shown closes switch SW3 and completes the circuit so far described to switch SW6.

As mentioned above, the apparatus illustrated is wired for three possible operations depending upon the keyboard keys depressed; program C will be effected when none of the Columns A and B Symbol Keys 9 and 9′ is depressed, this operation being controlled through terminal *c* of the fixed switch plate 151. This is the operation that would be effected in the circuit illustrated in FIG. 11 since all the Column A and B Symbol Keys 9 and 9′ are in their raised positions. Thus, it can be seen that the circuit from switch SW3 will be completed through lead 313 to upper contact SW6–1 of the Column B Symbol Keys, lead 314, upper contact SW5–1 of the Column A Symbol Keys, lead 15 to terminal *c* of the stationary switch plate 151.

Program B is effected if a key 9 in the Column A Symbol Keys is depressed, whereupon switch SW5 would be actuated to engage its lower contact SW5–2, which in turn would connect through lead 316 to terminal *b* of the stationary switch plate. Program C is effected when a key 9′ in the Column B Symbol Keys is depressed, this causing its switch SW6 to engage its lower contact SW6–2 which in turn connects through lead 317 to terminal *a* of the stationary switch plate. Note that the latter operation, that is for program C, will not be affected by the depression or non-depression of a Column A Symbol Key, since the circuit through contacts SW6–2 is completely independent of the condition of the Column A Symbol Keys. It will be appreciated that many other types of operational controls could be effected through switch assemblies 151 and 152.

As shaft 150 rotates and carries with it the rotary wiper disk 152, contacts 155 will be successively scanned by contacts 161–163 of the wiper assembly. With the condition illustrated in FIG. 11, wherein none of the Columns A and B Symbol Keys 9 and 9′ is depressed, it is seen from the foregoing that the circuit is connected to terminal *c* of the fixed switch plate 151. Thus, when contact 162 engages contact 155 connected to terminal *c*, this will complete the circuit to common contact 156, through lead 318 to one side of solenoid S2, and from there to line 301 of the power supply. It is thus seen that when shaft 150 assumes this position to cause contact 162 to engage the contact for terminal *c*, solenoid S2 will be energized to actuate stop plate 187 to cause the latter to seat in the step of disk 165 presented at that instant, and thereby to arrest the rotation of shaft 150 in that position.

In a similar manner, if a Column A Symbol Key 9 is depressed, but not a Column B Symbol Key 9, the circuit will be completed, as described above, through contact SW5 and lead 316 to terminal *b*, so that the rotation of shaft 150 will be arrested at the position where contact 162 is in engagement with the contact 155 connected to terminal *b* of the fixed switch plate 151. In a similar manner, if a Column B Symbol Key 9′ is depressed, irrespective of whether a Column A Symbol Key 9 is depressed, the circuit will be completed through lead 317 to terminal *a* of the stationary switch plate 151, which will cause the rotation of shaft 150 to be arrested when the corresponding contact 155 of the stationary switch plate is engaged by contact 162 of the rotary wiper assembly.

Cycling of the apparatus is initiated by energizing solenoid S1 (FIG. 11) which, as will be recalled from the foregoing description, pulls down its armature 67 and lever 79 so as to remove arm 78 from engagement with the lip 77 of spring 70. This permits the spring to contract and to tightly grip the drums of pulley 65 and cam shaft 40 and to thereby couple the cam shaft to the drive.

Solenoid S1 is actuated through switch SW2 which is closed when an operational control key is depressed, FIG. 11 illustrating this key to be Item Key 10'. However, energization of solenoid S1 and cycling of the apparatus also requires that an amount be entered in the keyboard, and further that the check be properly located with respect to the printing wheels 24 and that the stop 31 be raised. For this purpose, the energization circuit of solenoid S1 includes switch SW4, closed when an amount key 8 is depressed, contacts RC2 and RS1, closed when the check is properly registered and the stop 31 is raised, as well as switch SW2, closed when an operational control key is depressed. One side of solenoid S1 is connected to switch SW2 of the foregoing circuit through lead 320, and the other side is directly connected to line 301 of the power supply through lead 321.

*Operation*

Before describing the complete operation of the apparatus, it would be well to first refer to FIG. 10 which illustrates the timing of the more important mechanisms considered above. Curve A represents the timing of the adding machine unit 2 as controlled by its cam 15, which would also be the timing of printing wheels 24 inasmuch as they are continuously in mesh with the adding sectors 23 of the adding machine unit. Curve B represents the timing of rock shaft 177 of the printing control mechanism, this timing being controlled by cam 90. Curve C represents the timing of shaft 101 which lifts the interposers 33, this being controlled by cam 91. Curve D represents the timing of check stop 31 as controlled by its cam 92. And curve E represents the timing of aligner bail 28 controlled by its cam 93. Particular reference will be made to these timing curves in the description of the overall operation to follow.

First, manual switch MS (FIG. 11) is closed to connect motor M across the power source. As indicated above, motor M drives all the power driven units including check feeding belt 29 and the hammer drive roll 35, both of which are continuously driven whenever the apparatus is turned on.

In a typical operation, the operator would take a check C from the storage hopper 4 (FIG. 1), read the amount, introduce the required information into the keyboard 3 of adding machine unit 2 by depressing the appropriate amount keys 8, the appropriate (if any) keys 9 or 9' in the Columns A and B Symbol Keys, and Item Key 10'. At the time these keys are being depressed, the operator would also insert the check C into the feeding chute 5, whereupon it would be fed by belts 29 until it is intercepted by normally raised stop 31.

The foregoing manipulations by the operator can be handled in almost any order without affecting the operation of the machine. For example, the check may be inserted in the chute before or after the amounts are indexed into the keyboard. In any event, to cycle the apparatus for this operation, the check must have been properly positioned adjacent to check stop 31, at least one amount key 8 must have been depressed, and Item Key 10' must have been depressed. Whether or not a key 9 or 9' in the Columns A and B Symbol Key is depressed will not affect the cycling of the apparatus, but will rather affect the program of printing that will be followed during the cycling of the apparatus. For purposes of the following description of a typical operation, it will first be assumed that no key 9 or 9' was depressed, which is the condition illustrated in the circuit diagram of FIG. 11. However, the other programs effected by the depression of these keys will also be discussed.

When the check is properly positioned with respect to stop 31, it covers opening 242 (FIG. 11) so that photocell circuit 244 for corner detection does not receive light from lamp L2 and therefore permits gas tube T2 to conduct to energize relay RC through normally closed switch SW1, closing the relay's contacts RC1 and RC2. Switch SW1 had been closed in the previous cycle when check stop 31 assumed its elevated position which occurs at the 355° point (curve D, FIG. 10). In addition, when the check is properly positioned it covers opening 246 in the optical circuit for skew detection and therefore photocell circuit 248 enables gas tube T1 to conduct which energizes relay RS through previously closed contacts RC1, causing its contacts RS1 to close. Further, the entry of an amount in the keyboard by depressing any of the amount keys 8 closes switch SW4, and the depression of Item Key 10' closes switches SW2 and SW3.

Upon the happening of all the foregoing, solenoid S1 is energized through the following circuit: line 300 of the power supply, lead 310, closed contacts of switch SW4, closed contacts RC2 of relay RC, lead 311, closed contacts RS1 of relay RS, closed contacts of switch SW2, lead 320, solenoid S1, lead 321, and line 301 of the power supply. Energization of solenoid S1 pulls down its armature 67 which drops arm 79 from engagement with lip 77 of torsion spring 70, thereby permitting the spring to contact and to couple drum 71 (FIG. 4) of toothed wheel 72 with the drum fastened to camshaft 40. This initiates a single cycle of the apparatus, the various operations during the cycle being controlled by camshaft 40.

The cyclic operation of the adding machine unit 2 will first be described since the printing wheels 24 are constantly in mesh with this mechanism and will therefore follow the same cycle. Rotation of camshaft 40 also rotates eccentric 39 (FIG. 4) and thereby reciprocates pitman 20. As shown in FIG. 2, the pitman rocks cam plate 15 in the adding machine unit 2 which effects the differential movement of adding sectors 12 depending upon the value of the amount key 8 depressed in order to limit index bar 11, all in accordance with the normal operation of a Burroughs "Series P" adding machine. The arrangement of eccentric 39, pitman 20 and cam plate 15 is such as to start the differential movement of the adding sectors at the 45° point in the cycle. The differential movement is completed at the 115° point. All this is seen in curve A of FIG. 10 wherein it is also shown that restoration of the adding sectors 12 begins at the 245° point of the cycle and is completed at 315°. Printing wheels 24, being continuously in mesh with the adding sector extensions 23 (FIG. 2), will follow the same cycle, and it will thus be apparent that actual printing must occur between the 115° point and the 245° point, which is after the wheels have been differentially positioned and before their restoration begins. (Actually printing occurs between 153° and 168°, as will be described below.)

Camshaft 40, through cam 90 controls the printing and particularly the action of rock shaft 177. As shown in FIGS. 4, 4*a*, and 5, this cam acts on follower 181 and links 180, 179 (FIG. 4*a*), and 178 (FIG. 5) to control the movement of rock shaft 177. As soon as camshaft 40 begins its cycle, its follower 181 engages drop 90–1 in cam 90, causing rock shaft 177 to be rocked counterclockwise (as viewed in FIG. 5) for the first 8° of movement (curve B, FIG. 10). At this time arm 185 fastened at the right end of rock shaft 177 engages stud 188 of rock plate 186 and thus moves intermediate roll 175 carried by bail 176 into engagement with both the drive roll 170 and the knurled surface 160' of the wiper disks 160. Thus at the 8° point in the cycle, wiper assembly 152 will be rotated, and thereby also shaft 150 and the coding disks 37 carried by the shaft. Rock shaft 177 does not move between the 8° and 133° points of the machine cycle (dwell surface 90–2 of cam 90, FIG. 4*a*), to provide sufficient time for coding shaft 150 to complete the maximum rotational movement it may have to make to position its coding disks 37, this being no more than a complete rotational cycle. During this movement of shaft 150 and its coding disks 37, it will be appreciated that solenoid S2 is de-energized so that its stop plate 187 will be out of engagement with stepped plate 165. As soon as solenoid S2 is energized (the time depending upon the program to be in effect as will be soon explained), it pulls in its armature 190 thereby rocking stop plate 187 to cause its stop dog to seat on the appropriate step of stepped disk 165 and to thereby arrest its rotational movement. Energization of the solenoid also lowers arm 194 formed on the stop plate, thereby also lowering plate 186 to clear arm 185 of shaft 177 from stud 188. This removes the force that stud 188 applies to bail 176 and intermediate roll 177 and thereby decouples the latter roll from drive roll 170 and the wiper assembly 152.

Thus, at some point in the cycle before 133°, solenoid S2 will be energized to arrest the rotational movement of the coding shaft 150 and to decouple same from drive roll 170. This positions coding disks 37 in one of the eight program positions. The particular position that coding disks 37 will assume depends upon the keyboard depressed.

FIG. 11 illustrates the circuit condition involved when no keys 9 or 9' of the Columns A and B Symbol Keys are depressed, which brings program C into operation. Referring to the circuit of FIG. 11, it is seen that switch SW5 is in engagement with its upper contact SW5–1 since none of the Column A Symbol Keys 9 is depressed, and switch SW6 is in engagement with its upper contact SW6–1 since none of the Column B Symbol Keys 9' is depressed. This connects terminal *c* of the fixed switch plate 151 to line 300 of the power supply, through the following circuit: line 300, lead 310, switch SW4, contacts RC2, lead 311, contacts RS1, lead 312, switch SW3, lead 313, contact SW6–1, of switch SW6, lead 314, contact SW5–1 of switch SW5, lead 315, and terminal *c* of fixed switch plate 151. As shaft 150 rotates, wiper contact 162 successively wipes the fixed contacts 155 corresponding to the eight possible positions of the shaft, while wiper contact 161 rides on the common contact 156. When contact 162 engages the fixed contact 155 connected to terminal *c* of the terminals 153, a circuit is completed from that terminal through wiper contact 162 bridge piece 163, and contact 161 (all of the wiper disk assembly) to common contact 156. The latter is connected to lead 318 as shown in FIG. 11 which in turn is connected to one side of solenoid S2. The solenoid is thereby energized through the foregoing circuit completed to line 301 of the power supply.

It is thus seen that at the 8° point of the machine cycle, shaft 150 will begin to be rotated so that the contacts of wiper disk assembly 160 successively engage contacts 155 of the fixed switch plate 151. As soon as it engages the appropriate contact determined by the program to be effected, a circuit is completed to solenoid S2 to cause its stop plate 187 to arrest the further rotational movement of coding shaft 150. Energization of the solenoid will occur before the 133° point of the machine cycle, the particular point depending upon where coding shaft 150 was arrested in the preceding cycle. If the solenoid S2 does not become energized at the 133° point, printing will be completely blocked in that machine cycle in a manner to be described below.

The position that the coding disks 37 will assume for a program C operation is apparent from FIG. 9, wherein the middle disk 37L, diagrams the eight program positions. In program C, notches 38 are presented (to nose 201, FIG. 5) in all the disks except the last two, 37M and 37N controlling the printing of symbols from the Columns A and B Symbol Keys 9 and 9'. Since a notch must be presented in order for printing to occur, it is seen that printing will be effected from all the orders except the last two, this being the desired operation inasmuch as none of the Columns A and B Symbol Keys were depressed.

If a key 9 of the Column A Symbol Keys had been depressed, this would effect a program B operation wherein all orders will print except the last order, that of the Column B Symbol Keys. This is apparent from FIG. 11 wherein it is seen that depression of a key 9 would cause switch SW5 to engage contact SW5–2 and would thereby connect lead 314 to lead 316 (rather than lead 135) and then to terminal *b* of the fixed switch plate 151. Thus, when the rotary switch would engage the contact 155 connected to that terminal, solenoid S2 would be energized to arrest the rotation of shaft 150 in that position. When the shaft is so positioned for a program B operation, it is seen from FIG. 9 that notches 38 will be presented by all of the coding disks 37 except the last one 37N, and therefore printing will occur from all the orders except the last one corresponding to that of the Column B Symbol Keys.

Further, if a key 9' of the Column B Symbol Keys had been depressed (whether or not a key 9 of the Column A Symbol Keys had been depressed), it is seen that contact SW6–2 will be effective to connect lead 313 to lead 317 (rather than to lead 314), thereby enabling terminal *a* and its corresponding contact 155 to energize solenoid S2 in the program A position, wherein a notch 38 is presented on all of the disks 37 to cause printing to occur in all 14 orders.

Continuing with the description for a program C operation, it is seen that at the 133° point of the machine cycle, there is a further drop 90–3 in the surface of cam 90 causing rock shaft 177 to move further in the same counterclockwise direction. In the event solenoids S2 had not been energized at that point, plate 186 would not have been lowered, and therefore stud 188 would be in the path of arm 185 and would block that arm and rock shaft 177 from moving further. As will be brought out below, this further movement of the rock shaft is required to permit printing. Therefore, if solenoid S2 had not been energized at the 133° point (because of a particular program not herein described or because of a malfunction), printing from all the orders will be blocked.

Rock shaft 177 is rotated counterclockwise between the 133° point and the 160° point (curve B, FIG. 10) of the machine cycle. It is during this period of the machine cycle that printing is initiated.

Reference is now made to curve C of FIG. 10 which illustrates the movement of shaft 101 which lifts the interposers 33. Cam 91 (FIG. 4*a*), which drives shaft 101 through elements 103, 111, is formed with a slight rise 91–1 from its 0° point to its 126° point and then with a dwell 91–2 to the 140° point. Thus, referring to FIG. 5, it is seen that all the interposers 33 begin to rise at the beginning of the machine cycle and continue until the 126° point, and then rest until the 140° point. The amount of rise at the 126° point is not sufficient for their recesses 203 to clear their respective catches 202. The 14° dwell until the 140° point of the cycle is to permit the catches 202 to clear recesses 203 in those interposers in which this is programmed to occur, namely where a notch 38 is presented to nose 201 of the slide in its respective order.

At the 133° point, the further rocking of shaft 177 causes arms 209 and 210 fixed to the shaft to ride on studs 206' and 207' which permits bail 205 to move forwardly, and thereby also slides 200, both under the action of springs 204. This forward movement of the bail permits the slides 200 to move into the notches 38 of their respective coding disks 37, assuming a notch is there. Thus, if a notch is presented, slides 200 move forwardly until catch 202 clears the recesses of its respective interposer 33, whereas if a notch is not presented, slide 200 is blocked from movement and thus leaves its catch 202 in the recess to block the further elevation of its respective interposer. In the program C operation now being described, a notch 38 will be presented in all coding disks 37 except the last two orders corresponding to those for the Columns A and B Symbol Keys, and therefore catches 202 will be removed from the recesses 203 of all the interposers 33 except those corresponding to the last two orders. All the interposers will thus be permitted to rise into contact with the check C, except these last two orders.

Continued movement of bail 205 after the 133° point of the machine cycle, and thereby movement of the slides 200, also permits slide 122 in each order to move forwardly under the tension of its spring 218, this action taking place as nose 201 of the slide 200 seats in the notch 38 of its coding disk 37. At the 138° point of the machine cycle, in each order that slide 122 is permitted to move because of a notch 38 in its coding disk 37, nose 123 of slide 122 will engage nose 124 formed on the upper end of hammer shoe 118 and will pivot same about the shaft 115 until its cam segment 119 engages the hammer drive roll 35 to fire its respective hammer. Only the hammers of the left seven orders are permitted to fire at this point for the following reason: At this point (138°), bail 215 has not yet moved and therefore engages upstanding arms 217 (FIG. 7) of the slides 122 in the right seven orders, restraining the movement of these slides; however, since bail 215 is notched at 215′, which is that portion overlying the arms 217 for the left seven orders of slides 122, the hammers for these seven orders are not affected by bail 215. Accordingly, they will fire as soon as bail 210 causes their cam segments 118 to engage the hammer drive roll 35. This occurs at the 138° point of the machine cycle. The right seven orders are fired slightly later, at the 153° point of the machine cycle, as to be described below.

The further cycling of the machine past the 138° point, causes the further movement of rock shaft 177. Arms 220 and 221, whose cam surfaces 220′ and 221′ bear on studs 222 and 223 respectively at opposite ends of bail 215, are rocked to permit the latter bail to move forwardly under the influence of springs 218 attached to slides 122 which are controlled by the bail. As will be noted earlier, cam surfaces 220′ and 221 operating on bail 215 are slightly longer than cam surfaces 209′ and 210 operating on bail 205, such as to cause bail 215 to move forwardly about 15° of the machine cycle after bail 205. Thus, since bail 205 permits the forward movement of the slides 122 to enable them to fire their respective hammers at the 138° point of the machine cycle (i.e., only the left seven orders of the hammers, and of those, only the ones in which their respective coding disks 37 have presented notches 38 to nose 201), it is seen that bail 215 will permit the remaining coding slides 122 (i.e., the right seven orders) to fire their respective hammers at the 153° point of the machine cycle.

The foregoing arrangement is provided to prevent all the hammers from firing at the same instant and thus imposing a heavy load on the machine, particularly the hammer drive roll 35. By the provision of bail 215, the firing of the hammers can be delayed or controlled for almost any desired firing sequence.

It requires about 15° of the machine cycle between the time a hammer is fired and the time it actually strikes its interposer. At the time the interposer is struck, it will be in contact with the paper, but because of the 15° time delay, the hammer may be fired somewhat before the interposer actually contacts the paper.

This is the operation of the described apparatus, as is apparent from FIG. 10, particularly curves B and C. The left seven hammers (the earliest-fired ones) are fired at the 138° point (curve B), but all the interposers are moved together and do not reach their elevated positions until the 150° point (curve C). Thus, the interposers associated with the hammers will actually be struck 15° after 138°, i.e., the 153° point, which is after they have assumed their elevated positions in contact with the paper. The remaining interposers will be struck 15° after the 153° point in which their hammers are fired, i.e., at 168°.

At 180°, rock shaft 177 is rotated in the opposite direction, i.e., clockwise to restore the above-described mechanisms to their original condition, which takes place at the 235° point of the machine cycle.

At 183°, shaft 101 starts to lower which causes the interposers 33 to lower out of contact with the check. At 194° and until 210°, shaft 101 and its interposers do not move, to allow time for catches 202 to be inserted in the recesses 203 of the interposers. At 201°, shaft 101 is lowered further until it assumes its normal position with the interposers also in their normal positions out of contact with the check, this being completed at 220° of the machine cycle.

The restoration of shaft 101 also restores the hammers 34 to their normal positions resting against limit shaft 116. As will be recalled, the hammers after impact are intercepted and latched in intermediate positions by latching plates 130 for each hammer engageable with lugs 131 formed on the hammer arms 117. The purpose of intercepting the hammers in this intermediate position is to prevent the hammers from returning to their home positions in the middle of a machine cycle, where they may possibly fire a second time in the same cycle.

During the first portion of the machine cycle when shaft 101 is elevated to lift the interposers 33, link 133 (FIG. 5) is moved rearwardly by bell crank 106 and thereby lowers shaft 141 so as to enable all the latching plates 130 to be urged into latching position by springs 139. As shaft 101 is restored, following the 180° point of the machine cycle, link 133 is moved forwardly of the machine causing shaft 141 to move upwardly. This rocks all the latches 130 to disengage them from lugs 131 of all the hammers, thereby permitting the hammers to return by gravity to their normal positions, resting against limit shaft 116. It is thus noted that latches 131 cannot permit the hammers to restore until after the 183° point of the machine cycle, which is after all printing has occurred, and therefore a hammer cannot accidently print twice in the same cycle of the machine.

Curve D of FIG. 10 illustrates the timing of check stop 31, this being controlled by cam 92 as explained above. At the beginning of the cycle the check stop is in its elevated position; otherwise switch SW1 (FIG. 11) would be open and the machine would not cycle. At 195°, which is well after printing has occurred, and restoration of the printing mechanism has started, a high point 92–1 (FIG. 5) of cam 92 rocks arm 230 and thereby shifts plate 232 rearwardly which in turn pivots arm 233, and thereby moves arm 235 downwardly against pin 236 formed on the check stop 231. This causes the stop to move downwardly against the action of its spring 239. At 235°, the stop is all the way down so that it no longer interferes with the movement of the check C, and therefore the check is permitted to be moved by the feeding belt 29 past the printing station and into the receiving hopper 6. At 345°, which is ample time for the check to pass over the stop 31, the stop is quickly elevated to its normal upper position for interception of an oncoming check during the next cycle of operation. As mentioned earlier, should something block the proper positioning of stop 31 in its normal upper position at the beginning of a machine cycle (such as a check becoming lodged over the stop), switch SW1 (FIG. 11) will remain open and will thereby prevent the cycling of the machine for a succeeding operation.

Curve E of FIG. 10 illustrates the timing of bail 28 which is used to align and lock the printing wheels 24 before printing occurs, the operation of the bail mechanism being more clearly illustrated in FIG. 3. Bail 28 is controlled by cam 93 of camshaft 40.

Bail 28 is not engaged with the printing wheels 24 at the start of the machine cycle. It does not move until 116° (curve E, FIG. 10), which is after the differential movements of the adding machine unit, and thereby of the printing wheels, have occurred. The later movements are completed by the 115° point as illustrated in curve A, FIG. 10. At 116°, cam 93 acting on arm 251

(FIG. 3) drives the latter arm as well as its opposite arm 252 toward the printing wheels 24 tending to seat the bail 28 into the wheels for aligning and locking same before printing. Bail 28 is seated at 135°, before printing, and remains seated until 218°, which is well after printing has occurred and the restoration of the printing elements begun. Between 218° and 230°, bail 28 is removed from the printing wheels and assumes its normal starting position out of engagement with the wheels.

As explained earlier, a resilient coupling is made between arms 251, 252 and 257, 258 so that should bail 28 seat on a high point in a printing wheel as it is driven forwardly by cam 93, springs 259 and 260 forming the resilient coupling will yield so as not to bind the apparatus.

While the invention has been described with respect to a preferred embodiment thereof, it will be understood that the invention and/or various features thereof are capable of embodiment in other forms and that many changes and variations may be made within the spirit and scope of the invention as described in the following claims.

We claim:

1. Recording apparatus comprising a plurality of recording means each including an interposer; means for feeding a record medium into recording position with respect to said interposers; a plurality of hammers each cooperable with one of said interposers for recording on said record medium; means for driving said apparatus through cycles of operation; means operative during a cycle of operation for moving at least some of said interposers into relatively light contact with the record medium; and means operative during the cycle for firing the hammers cooperable with the moved interposers so they strike their respective interposers with a recording impact at a time in the cycle after the interposers have moved into contact with the record medium.

2. Printing apparatus comprising a plurality of printing elements; a plurality of interposers each cooperable with one of said printing elements; a plurality of hammers each cooperable with one of said interposers; means for feeding a record medium between said printing elements and their respective interposers; means for driving said apparatus through cycles of operation; means operative during a cycle of operation for moving said interposers into contact with the record medium; and means operative during the cycle for firing said hammers so they strike their respective interposers with a printing impact at a time in the cycle after the interposers have moved into contact with the record medium.

3. Printing appparatus comprising a plurality of printing elements; a plurality of interposers each cooperable with one of said printing elements; a plurality of hammers each engageable with one of said interposers; a power roll for driving said hammers; means for feeding a record medium between said printing elements and their respective interposers; means for driving said apparatus through cycles of operation; means operative during a cycle of operation for moving said interposers into relatively light contact with the record medium; and means operative during the cycle for coupling said hammers to said power roll so they strike their respective interposers with a printing impact after the interposers have moved into contact with the record medium.

4. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; a power roll for driving said hammers; fire control means for each hammer individually movable to couple its respective hammer to said power roll for driving said hammer therefrom; and means operative during the cycle for moving said fire control means to fire said hammers so they strike their respective interposers after the interposers have moved into contact with the record medium.

5. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; a power roll for driving said hammers; fire control means for each hammer individually movable to couple its respective hammer to said power roll for driving said hammer therefrom; means operative during the cycle for moving said fire control means to fire said hammers so they strike their respective interposers after the interposers have moved into contact with the record medium; and means to prevent movement of selected fire control means to suppress recording from selected recording elements.

6. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; a power roll for driving said hammers; fire control means for each hammer individually movable to couple its respective hammer to said power roll for driving said hammer therefrom; means operative during the cycle for moving said fire control means to fire said hammers so they strike their respective interposers after the interposers have moved into contact with the record medium; and means to delay the movement of at least some of said fire control means to distribute the load on said power roll.

7. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; a power roll for driving said hammers; fire control slides for each hammer individually movable to couple its respective hammer to said power roll for driving said hammer therefrom; means operative during the cycle for moving said fire control slides to fire said hammers so they strike their respective interposers after the interposers have moved into contact with the record medium; means to prevent movement of selected fire control slides to suppress recording from selected recording elements; and means to delay the movement of at least some of said fire control slides to distribute the load on said power roll.

8. Recording apparatus comprising a plurality of recording elements; means for feeding a record medium into recording position with respect to said recording elements; a plurality of hammers each cooperable with one of said recording elements and operative to record on said record medium; means for driving said apparatus through cycles of operation; a power roll for driving said hammers; fire control means for each hammer individually movable to couple its respective hammer to said power roll for driving said hammer therefrom; means operative during the cycle for moving said fire control means to fire said hammers to record on said record mediums; and means to delay the movement of at least some of said fire control means for a portion of the cycle to distribute the load on said power roll.

9. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; means operative during a later part of the cycle for firing said hammers so that they strike their respective interposers after they have moved into contact with the record medium; and means controlling said hammers so that they fire in a predetermined sequence.

10. Recording apparatus as defined in claim 9 wherein said last-named means comprises a bail operatively associated with the hammer firing means of said hammers, said bail being movable during a cycle of operation from a position blocking the firing of at least certain of said hammers to a position enabling said blocked hammers to fire.

11. Recording apparatus comprising a plurality of recording elements; means for feeding a record medium into recording position with respect to said recording elements; a plurality of hammers operative to effect recording from said recording elements onto said record medium; a power roll for driving said hammers; fire control means comprising a slide for each of said hammers individually movable to couple its respective hammer to said power roll for driving said hammer therefrom; each of said slides having an element projecting therefrom; a bail cooperable with the projecting elements of said slides for controlling the sequence in which the slides move and thereby the sequence in which the hammers fire; and means for moving said bail to control the firing of the hammers.

12. Recording apparatus comprising a plurality of recording elements; a plurality of interposers each cooperable with one of said recording elements; a plurality of hammers each cooperable with one of said interposers; means for feeding a record medium between said recording elements and their respective interposers; means for driving said apparatus through cycles of operation; means operative during a cycle of operation for moving said interposers into contact with the record medium; means for controlling said interposers to permit only selected ones to move into contact with the record medium and to suppress the movement of the others; means operative during the cycle for firing said hammers so they strike their respective interposers with a recording impact after they have moved into contact with the record medium; and means for controlling said hammers to permit only those cooperable with the interposers selected for movement to be fired and to strike their respective interposers.

13. Recording apparatus comprising a plurality of orders of recording elements; a plurality of interposers each cooperable with one of said recording elements; a plurality of hammers each cooperable with one of said interposers; means for feeding a record medium between said recording elements and their respective interposers; means for driving said apparatus through cycles of operation; a programming device for controlling the orders in which recording will be effected or suppressed; means operative during a cycle of operation for moving said interposers into contact with the record medium; means responsive to said programming device for controlling said interposers to permit only selected ones to move into contact with the record medium; means operative during the cycle for firing said hammers so they strike their respective interposers after they have moved into contact with the record medium; and means responsive to said programming device for controlling said hammers to permit only those cooperable with the selected interposers to be fired and to strike their respective interposers.

14. Printing apparatus comprising a keyboard having a plurality of depressible keys, a plurality of orders of printing elements differentially positionable in accordance with the keyboard keys depressed; a plurality of interposers each cooperable with one of said printing elements; a plurality of hammers each cooperable with one of said interposers; means for feeding a record medium between said printing elements and their respective interposers; means for driving said apparatus through cycles of operation; a coding device selectively conditionable during a cycle of operation to control the orders in which printing will be effected or suppressed; means responsive to the depression or non-depression of certain of the keyboard keys for selecting the condition of the coding device; means operative during a cycle of operation for moving said interposers into contact with the record medium; means responsive to said coding device for controlling said interposers to permit only selected ones to move into contact with the record medium; means operative during the cycle for firing said hammers so they strike their respective interposers after they have moved into contact with the record medium; and means responsive to said coding device for controlling said hammers to permit only those cooperable with the selected interposers to be fired and to strike their respective interposers.

15. Recording apparatus comprising a plurality of orders of recording elements; a plurality of interposers each cooperable with one of said recording elements; a plurality of hammers each engageable with one of said interposers; a power roll for driving said hammers; means for feeding a record medium between said recording elements and their respective interposers; means for driving said apparatus through cycles of operation; a programming device for controlling the orders in which recording will be effected or suppressed; means operative during a cycle of operation for moving said interposers into contact with the record medium; means responsive to said programming device for controlling said interposers to permit only selected ones to move into contact with the record medium; means operative during the cycle for coupling said hammers to the power roll for firing said hammers so they strike their respective interposers after they have moved into contact with the record medium; and means responsive to said programming device for controlling said hammers to permit only those cooperable with the selected interposers to be fired and to strike their respective interposers.

16. Printing apparatus comprising a keyboard having a plurality of depressible keys, a plurality of orders of printing elements differentially positionable in accordance with the keyboard keys depressed; means for feeding a record medium into printing position with respect to said printing elements; a plurality of interposers each movable into contact with said record medium and cooperable with one of said printing elements for printing therefrom; a plurality of hammers each operable to strike one of said interposers to effect printing from said printing elements onto said record medium; means for driving said apparatus through cycles of operation; a coding device selectively conditionable to control the orders in which printing will be effected or suppressed; means responsive to the depression or non-depression of certain of the keyboard keys for selecting the condition of the coding device; and means responsive to said coding device for controlling said interposers and hammers to permit only selected interposers to move into contact with said record medium and to permit only those hammers corresponding to the selected interposers to be fired and to effect printing.

17. Printing apparatus comprising a keyboard having a plurality of depressible keys, a plurality of orders of printing elements differentially positionable in accordance with the keyboard keys depressed; means for feeding a record medium into printing position with respect to said printing elements; a plurality of hammers operative to effect printing from said printing elements onto said record medium, means for driving said apparatus through cycles of operation; a coding device selectively positionable during a cycle of operation to control the orders in which printing will be effected or suppressed; said coding device comprising a rotatable shaft carrying a plurality of notched disks, there being one disk for each of said orders of printing elements; electrical switch means conditionable by the depression or non-depression of certain of the keyboard keys for selecting the position said rotatable shaft assumes during a cycle of operation; means for rotating said coding shaft during a cycle of operation; means for arresting said shaft when it asumes the position selected by said electrical switch means, to thereby position said notched disks in a predetermined position; and means responsive to the position of said notched disks for controlling said hammers to permit only selected ones to be fired and to effect printing.

18. Printing apparatus comprising a keyboard having a plurality of depressible keys, a plurality of orders of printing elements differentially positionable in accordance with the keyboard keys depressed; means for feeding a record medium into printing position with respect to said printing elements; a plurality of hammers operative to effect printing from said printing elements onto said record medium; means for driving said apparatus through cycles of operation; a coding device selectively positionable during a cycle of operation to control the orders in which printing will be effected or suppressed; said coding device comprising a rotatable shaft carrying a plurality of notched disks, there being one disk for each of said orders or printing elements; means responsive to the depression or non-depression of certain of the keyboard keys for selecting the rotational position said rotatable shaft assumes during a cycle of operation to selectively position said notched disks; a power roll for driving said hammers; fire control means comprising a slide for each of said hammers individually movable to couple its respective hammer to said power roll for driving said hammer therefrom; and means responsive to the position of each of said notched disks for determining whether or not each fire control slide moves to fire its respective hammer.

19. Printing apparatus comprising a keyboard having a plurality of depressible keys, a plurality of orders of printing elements differentially positionable in accordance with the keyboard keys depressed; means for feeding a record medium into printing position with respect to said printing elements; a plurality of hammers operative to effect printing from said printing elements onto said record medium; means for driving said apparatus through cycles of operation; a coding device selectively positionable during a cycle of operation to control the orders in which printing will be effected or suppressed; said coding device comprising a rotatable shaft carrying a plurality of notched disks, there being one disk for each of said orders or printing elements; means responsive to the depression or non-depression of certain of the keyboard keys for selecting the rotational position said rotatable shaft assumes during a cycle of operation to selectively position said notched disks; a power roll for driving said hammers; fire control means comprising a slide for each of said hammers individually movable to couple its respective hammer to said power roll for driving said hammer therefrom; means responsive to the positions of each of said notched disks for determining whether or not each fire control slide moves to fire its respective hammer; and means cooperable with each of said fire control slides for determining the sequence in which said slides may move and thereby the sequence in which said hammers may fire.

No references cited.